United States Patent
Jung et al.

(10) Patent No.: US 9,253,671 B2
(45) Date of Patent: Feb. 2, 2016

(54) METHOD FOR LOGGING AND REPORTING HETEROGENEOUS NETWORK INFORMATION IN WIRELESS COMMUNICATION SYSTEM AND DEVICE FOR SUPPORTING SAME

(75) Inventors: Sung Hoon Jung, Anyang-si (KR); Seoung June Yi, Anyang-si (KR); Young Dae Lee, Anyang-si (KR); Sung Jun Park, Anyang-si (KR); Jae Wook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 14/114,488

(22) PCT Filed: Aug. 26, 2012

(86) PCT No.: PCT/KR2012/003263
§ 371 (c)(1),
(2), (4) Date: Oct. 28, 2013

(87) PCT Pub. No.: WO2012/148203
PCT Pub. Date: Nov. 1, 2012

(65) Prior Publication Data
US 2014/0056168 A1    Feb. 27, 2014

Related U.S. Application Data

(60) Provisional application No. 61/479,835, filed on Apr. 27, 2011.

(51) Int. Cl.
*H04W 24/00*    (2009.01)
*H04W 24/08*    (2009.01)
*H04W 24/10*    (2009.01)

(52) U.S. Cl.
CPC .............. *H04W 24/08* (2013.01); *H04W 24/10* (2013.01)

(58) Field of Classification Search
None
See application file for complete search history.

(56) References Cited

U.S. PATENT DOCUMENTS 6,167,449 A * 12/2000 Arnold et al. ................. 709/227
6,327,591 B1 * 12/2001 Osborn et al.
(Continued)

FOREIGN PATENT DOCUMENTS

CN    101931981 A    12/2010
EP    2437540 A1    4/2012
(Continued)

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive . . . ," 3GPP TS 37.320 V10.1.0, Mar. 2011, 17 pages.
Cmcc et al., "Neighbouring Cell Measurements Logging and Reporting," 3GPP TSG-RAN WG2 Meeting #71, Aug. 23-27, 2010, pp. 1-2, R2-104552.
(Continued)

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

A method for reporting, performed UE, in a wireless communication system is provided. The method includes receiving a logged measurement configuration comprising logging object heterogeneous network information, attempting to detect a radio signal transmitted by a heterogeneous network, checking a heterogeneous network type of the heterogeneous network when the radio signal is detected, determining whether or not the heterogeneous network is a logging object based on the logging object heterogeneous network information and the determined heterogeneous network type, logging information about the heterogeneous network and common logging information if the heterogeneous network is the logging object, and reporting the logged information.

16 Claims, 23 Drawing Sheets

(56) References Cited

U.S. PATENT DOCUMENTS

| | | | |
|---|---|---|---|
| 6,535,908 B1 * | 3/2003 | Johnson et al. | 707/613 |
| 7,099,305 B1 * | 8/2006 | Fardid | 370/352 |
| 8,400,949 B2 * | 3/2013 | Callender et al. | 370/278 |
| 2010/0113009 A1 | 5/2010 | Jeong et al. | |
| 2010/0190488 A1 | 7/2010 | Jung et al. | |
| 2012/0088457 A1 | 4/2012 | Johansson et al. | |
| 2013/0265903 A1 | 10/2013 | Kim et al. | |

FOREIGN PATENT DOCUMENTS

| | | |
|---|---|---|
| KR | 10-2010-0050339 A | 5/2010 |
| KR | 10-2010-0088085 A | 8/2010 |
| KR | 10-2010-0138775 A | 12/2010 |
| WO | WO 2011/047348 A1 | 4/2011 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); . . . (Release 10)," 3GPP TS 36.300 V10.3.0, Mar. 2011, pp. 1-197.

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection . . . (Release 10)," 3GPP TS 37.320 V10.0.0, Dec. 2010, 18 pages.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)" 3GPP TS 37.320 V10.0.0 (Dec. 2010).

* cited by examiner

METHOD FOR LOGGING AND REPORTING HETEROGENEOUS NETWORK INFORMATION IN WIRELESS COMMUNICATION SYSTEM AND DEVICE FOR SUPPORTING SAME

CROSS REFERENCE TO RELATED APPLICATIONS

This application is the National Phase of PCT/KR2012/003263 filed on Apr. 26, 2012, which claims priority under 35 U.S.C. 119(e) to U.S. Provisional Application No. 61/479,835 filed on Apr. 27, 2011, all of which are hereby expressly incorporated by reference into the present application.

TECHNICAL FIELD

The present invention relates to a wireless communication system and, more particularly, to a method of logging information about a heterogeneous network in an environment in which a wireless communication system and a heterogeneous network are mixed, a method of reporting the information to a network, and an apparatus supporting the same.

BACKGROUND ART $3^{rd}$ Generation Partnership Project (3GPP) Long Term Evolution (LTE), that is, the improvement of an LTE Universal Mobile Telecommunications System (UMTS), has been introduced as 3GPP release 8. 3GPP LTE uses Orthogonal Frequency Division Multiple Access (OFDMA) in downlink and uses Single Carrier-Frequency Division Multiple Access (SC-FDMA) in uplink. 3GPP LTE adopts Multiple Input Multiple Output (MIMO) having a maximum of 4 antennas. Recently, 3GPP LTE-Advanced (LTE-A), that is, the evolution of 3GPP LTE, is being discussed.

A Minimization Drive Test (MDT) is that service providers perform a test using UE instead of a vehicle for coverage optimization. Coverage varies depending on the location of a BS, the deployment of peripheral buildings, and a user use environment. Accordingly, a service provider needs to periodically perform a driving test, and lots of costs and resources are consumed. An MDT is that a service provider measures coverage using UE.

An MDT can be divided into a logged MDT and an immediate MDT. In accordance with the logged MDT, UE performs MDT measurement and then transfers logged measurement to a network at a specific point of time. In accordance with the immediate MDT, UE performs MDT measurement and then transfers measurement to a network when a report condition is satisfied. In the logged MDT, MDT measurement is performed in an RRC idle mode, whereas in the immediate MDT, MDT measurement is performed in an RRC connected mode.

Today, as data is explosively used by users, the introduction of heterogeneous networks, such as a Closed Subscriber Group (CSG) cell, a hybrid cell, a Multimedia Broadcast and Multicast Service (MBMS)-supporting cell and/or a heterogeneous wireless communication system, such as a WLAN, is gradually increased for the purpose of traffic offloading and service differentiation. The introduction of such heterogeneous networks can result in a problem in that the complexity of a radio environment is increased, with the result that a problem in that operations related to the existing measurement/mobility of UE may not be normally performed is generated. That is, in an environment in which heterogeneous networks are mixed, there is a possibility that usage efficiency of radio resources may be deteriorated. Accordingly, there is a need for the introduction of a method capable of logging information about a heterogeneous network and reporting the information to a network such that service quality provided to UE can be optimally maintained and efficiency of radio resources can be maximized in an environment in which heterogeneous networks are mixed.

DISCLOSURE

Technical Problem

An object of the present invention is to provide a method of logging and reporting, by UE, information about a heterogeneous network in a wireless communication system mixed with a heterogeneous network and an apparatus supporting the same.

Technical Solution

In an aspect, a method for reporting, performed by user equipment (UE), in a wireless communication system is provided. The method includes receiving a logged measurement configuration comprising logging object heterogeneous network information, attempting to detect a radio signal transmitted by a heterogeneous network, checking a heterogeneous network type of the heterogeneous network when the radio signal is detected, determining whether or not the heterogeneous network is a logging object based on the logging object heterogeneous network information and the determined heterogeneous network type, logging information about the heterogeneous network and common logging information if the heterogeneous network is the logging object, and reporting the logged information. The logging object heterogeneous network information indicates a type of at least one heterogeneous network that is the logging object. The step of determining whether or not the heterogeneous network is the logging object includes determining that the heterogeneous network is the logging object if the determined heterogeneous network type is included in the type of at least one heterogeneous network indicated by the logging object heterogeneous network information.

The logged measurement configuration may further include logging interval information indicative of an interval in which the detection of the radio signal is attempted.

The step of attempting to detect the radio signal may be periodically performed based on the interval.

The common logging information may include at least one of information about a location of the UE when the logging is performed, information about a time when the logging is performed, information about an identity of a serving cell when the logging is performed, and a measurement level of the serving cell.

The step of reporting the logged information may include sending, by the UE, a logged information-available indicator to a target cell with which a Radio Resource Control (RRC) connection has been established, the logged information-available indicator indicating that the logged information to be reported is present, receiving a report request from the target cell as a response to the logged information-available indicator, and sending all or part of the logged information to the target cell in response to the report request.

The type of the at least one heterogeneous network that may be the logging object indicated by the logging object heterogeneous network information comprises one or more of a Closed Subscriber Group (CSG) cell, a hybrid cell, a cell supporting Multimedia Broadcast and Multicast Service (MBMS), a femto cell, a pico cell, and a Wireless Local Area Network (WLAN).

If the heterogeneous network is the CSG cell or the hybrid cell, the step of determining the type of heterogeneous network may include determining the type of heterogeneous network based on a cell identity included in system information transmitted by the heterogeneous network.

If the heterogeneous network is the logging object, the information about the heterogeneous network may include at least one of a cell identity of the heterogeneous network, a heterogeneous network type indicator indicative of the type of heterogeneous network, a CSG indicator of the heterogeneous network, a CSG identity of the heterogeneous network, an indicator indicative of whether or not the UE is a member of the heterogeneous network, an access mode of the heterogeneous network, an indicator indicative of a Public Land Mobile Network (PLMN) corresponding to the heterogeneous network, and an indicator indicative of whether or not the heterogeneous network manages an Almost Blank Subframe (ABS).

If the heterogeneous network is the femto cell or the pico cell, the step of determining the type of heterogeneous network may include determining the type of heterogeneous network based on information about a cell size which is included system information transmitted by the heterogeneous network.

If the heterogeneous network is the logging object, the information about the heterogeneous network may at least one of a cell identity of the heterogeneous network, a measurement value for the heterogeneous network, information indicative of a size of the heterogeneous network, information indicative of a cell type of the heterogeneous network, a specific cell identity list permitted to be used by only specific cell types of cells, such as the heterogeneous network, an indicator indicative of a PLMN corresponding to the heterogeneous network, and an indicator indicative of whether or not the heterogeneous network manages an ABS.

If the heterogeneous network is the cell supporting MBMS, the step of determining the type of heterogeneous network may include determining the type of heterogeneous network based on an indicator of service which is supported by the heterogeneous network and included in system information transmitted by the heterogeneous network.

If the heterogeneous network is the logging object, the information about the heterogeneous network may include at least one of MBMS session identity information, MBMS service identity information, information about at least one frequency provided by MBMS service, information about a frequency selected by the UE in order to receive MBMS service, MBSFN subframe configuration information, and information necessary to receive MBMS control information related to an MBSFN area.

In the heterogeneous network is a WLAN and the heterogeneous network is the logging object, the information about the heterogeneous network may include at least one of a Service Set ID (SSID) of the heterogeneous network, a beacon frame transmission period of the heterogeneous network, Received Signal Strength Indicator (RSSI)) of the heterogeneous network, a Signal to Noise Ratio (SNR) of the heterogeneous network, a security mode and a security algorithm operating in the heterogeneous network, information about a channel of the heterogeneous network, and WLAN technology type indication information about the heterogeneous network.

In another aspect, a wireless apparatus is provided. The wireless apparatus includes a transceiver transmitting and receiving radio signals, and a processor operably coupled to the transceiver. The processor is configured to receive a logged measurement configuration comprising logging object heterogeneous network information, attempt to detect a radio signal transmitted by a heterogeneous network, check a heterogeneous network type of the heterogeneous network when the radio signal is detected, determine whether or not the heterogeneous network is a logging object based on the logging object heterogeneous network information and the determined heterogeneous network type, log information about the heterogeneous network and common logging information if the heterogeneous network is the logging object, and report the logged information. The logging object heterogeneous network information indicates a type of at least one heterogeneous network that is the logging object. The step of determining whether or not the heterogeneous network is the logging object comprises determining that the heterogeneous network is the logging object if the determined heterogeneous network type is included in the type of at least one heterogeneous network indicated by the logging object heterogeneous network information.

The logged measurement configuration may further include logging interval information indicative of an interval in which the detection of the radio signal is attempted.

The step of attempting to detect the radio signal may be periodically performed based on the interval.

The common logging information may include at least one of information about a location of the UE when the logging is performed, information about a time when the logging is performed, information about an identity of a serving cell when the logging is performed, and a measurement level of the serving cell.

The step of reporting the logged information may include sending, by the UE, a logged information-available indicator indicating that the logged information is present to a target cell with which a Radio Resource Control (RRC) connection has been established, receiving a report request from the target cell as a response to the logged information-available indicator, and sending part of the entire logged information to the target cell in response to the report request.

Advantageous Effects

UE can log information about a heterogeneous network in an environment in which a heterogeneous network and a wireless communication system are mixed and report the information to a network. UE obtains information about the type of heterogeneous network to be logged from a network and determines whether a heterogeneous network corresponds to a logging object type when detecting a radio signal from the corresponding heterogeneous network. The UE can selectively log heterogeneous network information about the heterogeneous network corresponding to the logging object type.

A network can selectively obtain logged heterogeneous network information from UE. Thus, the network can check the influence of an environment in which heterogeneous networks are mixed on a wireless communication system. The network can optimize the environment of the wireless communication system mixed with the heterogeneous network based on a result of the check. Accordingly, service quality provided to a user can be improved, and the utilization of radio resources can be improved.

MODE FOR INVENTION

Figure 1:
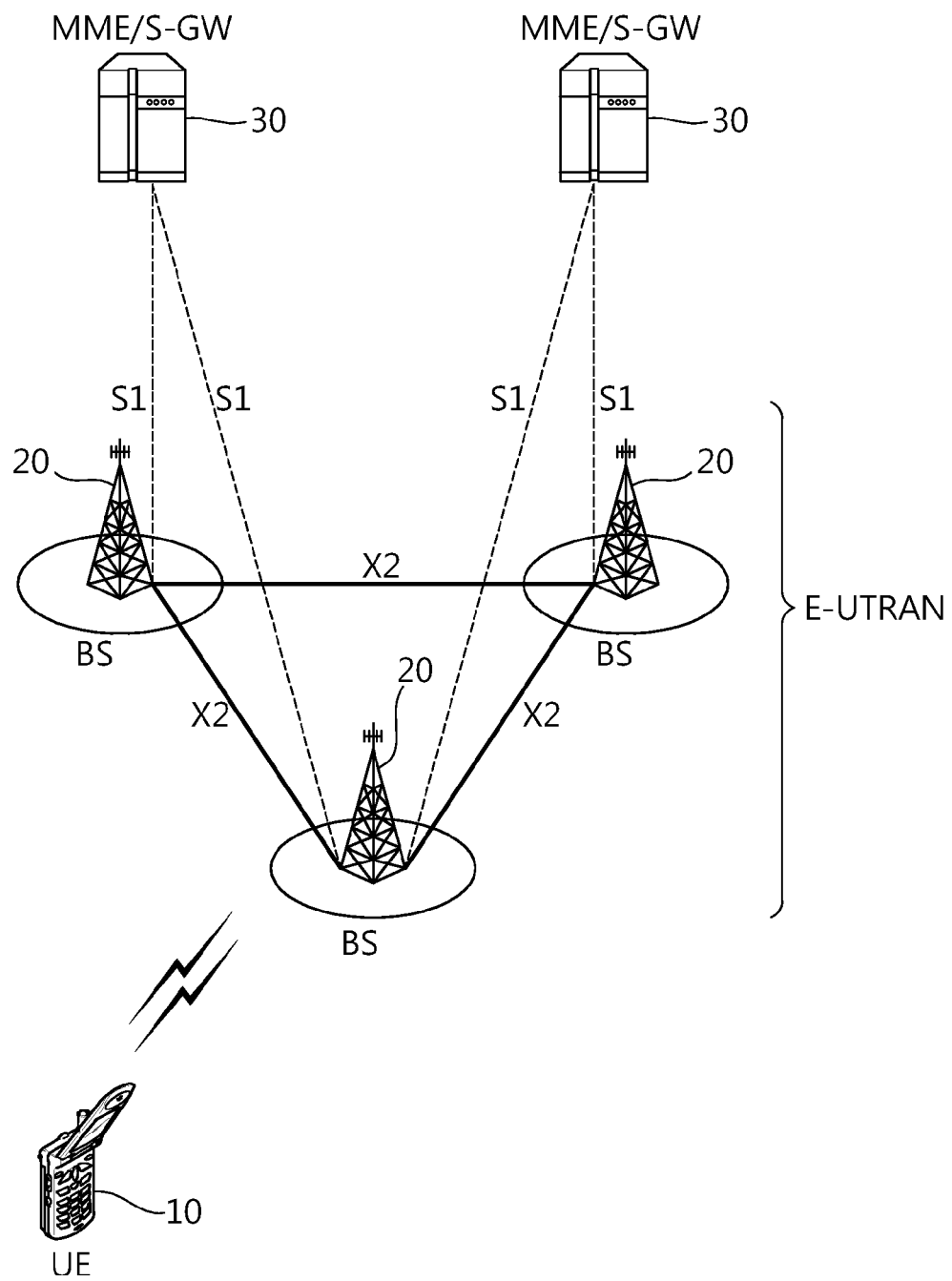
FIG. 1 shows a wireless communication system to which the present invention is applied.

FIG. 1 shows a wireless communication system to which the present invention is applied. The wireless communication system may also be called an Evolved-UMTS Terrestrial Radio Access Network (E-UTRAN) or a Long Term Evolution (LTE)/LTE-A system.

The E-UTRAN includes a Base Station (BS) 20 which provides User Equipment (UE) 10 with a control plane and a user plane. The UE 10 may be fixed or may have mobility. The UE 10 may be called another term, such as a Mobile Station (MS), a User Terminal (UT), a Subscriber Station (SS), a Mobile Terminal (MT), or a wireless device. The BS 20 refers to a fixed station communicating with the UE 10 and may be called another term, such as an evolved-NodeB (eNB), a Base Transceiver System (BTS), or an access point.

The BSs 20 may be interconnected through an X2 interface. The BS 20 is connected to an Evolved Packet Core (EPC) 30 through an S1 interface, more particularly, to a Mobility Management Entity (MME) through an S1-MME and a Serving Gateway (S-GW) through an S1-U.

The EPC 30 includes the MME, the S-GW, and a Packet Data Network-Gateway (P-GW). The MME has access information about UE or information about the capabilities of UE. Such information is chiefly used in the mobility management of UE. The S-GW is a gateway having an E-UTRAN as an end point, and the P-GW is a gateway having a PDN as an end point.

The layers of a radio interface protocol between UE and a network may be classified into L1 (first layer), L2 (second layer), and L3 (third layer) based on lower 3 layers of an Open System Interconnection (OSI) reference model which is widely known in communication systems. From among the layers, the PHY layer belonging to the first layer provides information transfer service using physical channels, and a Radio Resource Control (RRC) layer placed in the third layer functions to control radio resources between UE and a network. To this end, the RRC layer exchanges RRC messages between UE and a BS.

Figure 2:
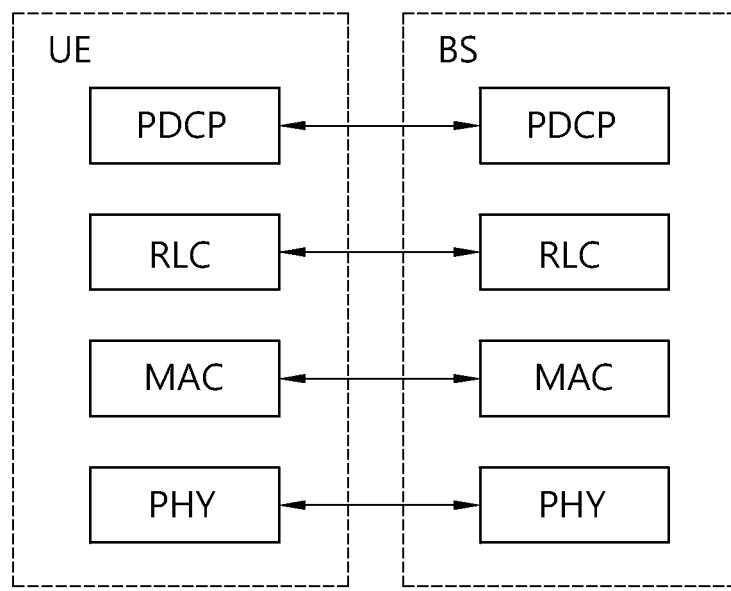
FIG. 2 is a block diagram showing a radio protocol architecture for a user plane.
Figure 3:
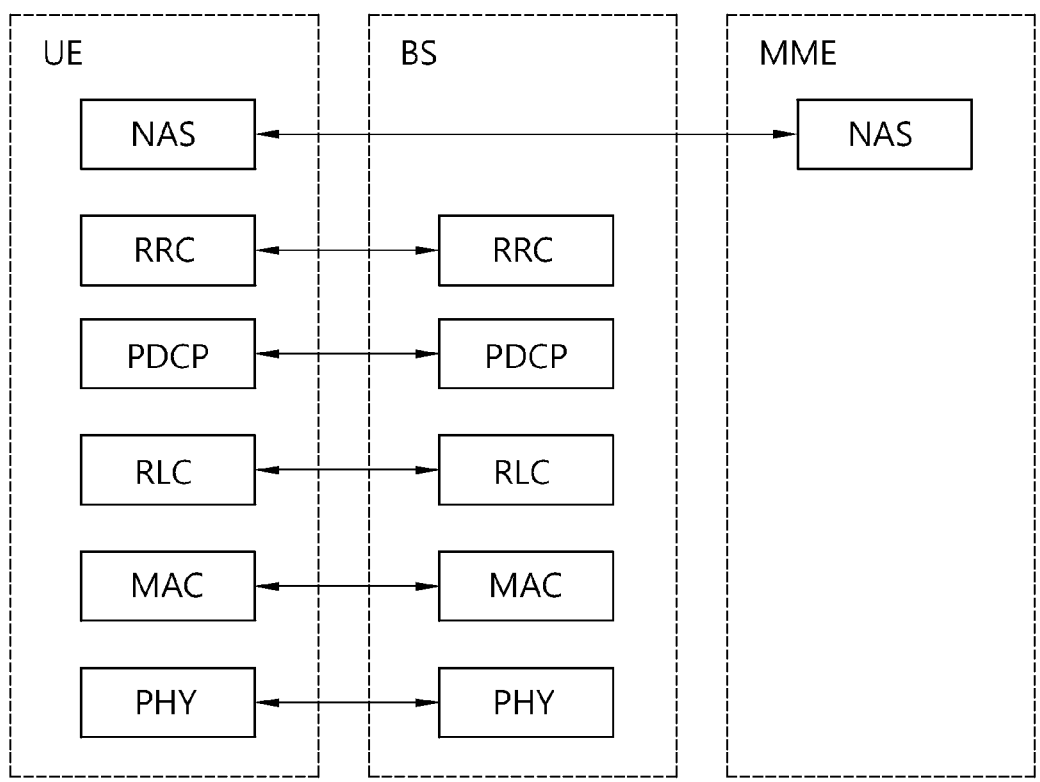
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. A data plane is a protocol stack for user data transmission, and a control plane is a protocol stack for control signal transmission.

Referring to FIGS. 2 and 3, a physical (PHY) layer provides a higher layer with information transfer service using physical channels. The PHY layer is connected to a Medium Access Control (MAC) layer, that is, a higher layer, through a transport channel. Data is moved between the MAC layer and the PHY layer through the transport channel. The transport channel is classified depending on how data is transmitted through a radio interface according to what characteristics.

Data is transferred between different PHY layers, that is, between the PHY layers of a transmitter and a receiver, through a physical channel. The physical channel may be modulated according to an Orthogonal Frequency Division Multiplexing (OFDM) scheme, and the physical channel uses the time and frequency as radio resources.

The functions of the MAC layer include mapping between a logical channel and a transport channel and multiplexing/de-multiplexing to a transport block that is provided to a physical channel on the transport channel of an MAC Service Data Unit (SDU) that belongs to a logical channel. The MAC layer provides service to a Radio Link Control (RLC) layer through a logical channel.

The functions of the RLC layer include the concatenation, segmentation, and reassembly of an RLC SDU. In order to guarantee various types of Quality of Service (QoS) required by a Radio Bearer (RB), the RLC layer provides three operation modes: a Transparent Mode (TM), an Unacknowledged Mode (UM), and an Acknowledged Mode (AM). AM RLC provides error correction through an Automatic Repeat Request (ARQ).

The functions of a Packet Data Convergence Protocol (PDCP) layer in the user plane include the transfer, header compression, and ciphering of user data. The functions of the PDCP layer in the user plane include the transfer and ciphering/integrity protection of control plane data.

The Radio Resource Control (RRC) layer is defined only in the control plane. The RRC layer is related to the configuration, re-configuration, and release of RBs and responsible for control of logical channels, transport channels, and physical channels. An RB means a logical path that is provided by the first layer (PHY layer) and the second layers (the MAC layer, the RLC layer, and the PDCP layer) for the transfer of data between UE and a network.

What an RB is configured means a process of regulating the characteristics of a radio protocol layer and channel and configuring each detailed parameter and operation method in order to provide specific service. An RB may be divided into a Signaling RB (SRB) and a Data RB (DRB). The SRB is used as a passage along which an RRC message is transported in the control plane, and the DRB is used as a passage along which user data is transported in the user plane.

If an RRC connection is established between the RRC layer of UE and the RRC layer of an E-UTRAN, the UE is in an RRC connected state. If not, the UE is in the RRC_idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through a downlink SCH or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or a control message is transmitted.

Logical channels placed over a transport channel and mapped to the transport channel include a broadcast control channel (BCCH), a paging control channel (PCCH), a common control channel (CCCH), a multicast control channel (MCCH), a multicast traffic channel (MTCH), and so on.

A physical channel includes several OFDM symbols in a time domain and several subcarriers in a frequency domain. One subframe consists of a plurality of OFDM symbols in the time domain. A resource block is a resource allocation unit, and a resource block consists of a plurality of OFDM symbols and a plurality of subcarriers. Furthermore, each subframe may use specific subcarriers of specific OFDM symbols (e.g., the first OFDM symbol) of a corresponding subframe for a physical downlink control channel (PDCCH), that is, an L1/L2 control channel. A Transmission Time Interval (TTI) is a unit time for subframe transmission.

An RRC state and RRC connection method of UE are described below.

An RRC state means whether or not the RRC layer of UE has been logically connected with the RRC layer of an E-UTRAN. If the RRC layer of UE is logically connection with the RRC layer of an E-UTRAN, it is called the RRC_connected state. If the RRC layer of UE is not logically connection with the RRC layer of an E-UTRAN, it is called the RRC_idle state. Since UE in the RRC_connected state has an RRC connection, an E-UTRAN may check the presence of the UE in a cell unit, and thus the UE may be effectively controlled. In contrast, an E-UTRAN cannot check UE in the RRC_idle state, and UE in the RRC_idle state is managed by a Core Network (CN) in a tracking area, that is, an area unit greater than a cell. That is, the presence of UE in the RRC_idle state is checked in a larger area unit, and the UE in the RRC_idle state needs to move to the RRC_connected state in order to receive common mobile communication service, such as voice or data.

When a user first powers on UE, the UE first searches for a suitable cell and remains in the RRC_idle state in a corresponding cell. UE in the RRC_idle state establishes an RRC connection with an E-UTRAN through an RRC connection procedure when it needs to establish the RRC connection and shifts to the RRC_connected state. A case where the UE in the RRC_idle state needs to establish the RRC connection includes several cases. For example, the UE in the RRC_idle state establishes an RRC connection when it needs to send uplink data for a reason, such as a call attempt by a user, or when it sends a message in response to a paging message received from an E-UTRAN.

A Non-Access Stratum (NAS) layer placed over the RRC layer performs functions, such as session management and mobility management.

In order to manage the mobility of UE in the NAS layer, two states: EPS Mobility Management-REGISTERED (EMM-REGISTERED) and EMM-DEREGISTERED are defined. The two states are applied to UE and an MME. Initial UE is in the EMM-DEREGISTERED state. In order for the UE to access a network, the UE performs a process of being registered with the network through an initial attach procedure. If the attach procedure is successfully performed, the UE and the MME become the EMM-REGISTERED state.

In order to manage signaling connection between UE and an EPC, two states: an EPS Connection Management (ECM)-IDLE state and an ECM-CONNECTED state are defined. The two states are applied to UE and an MME. If UE in the ECM-IDLE state establishes an RRC connection with an E-UTRAN, the UE becomes the ECM-CONNECTED state. If an MME in the ECM-IDLE state establishes an S1 connection with the E-UTRAN, the MME becomes the ECM-CONNECTED state. When UE is in the ECM-IDLE state, an E-UTRAN does not have context information about the UE. Accordingly, the UE in the ECM-IDLE state performs a mobility-based procedure based UE, such as cell selection or cell reselection, without a need to receive a command from a network. In contrast, when UE is in the ECM-CONNECTED state, the mobility of the UE is managed by a command from a network. If the location of UE is different from a location known to a network in the ECM-IDLE state, the UE informs the network of the location of the UE through a tracking area update procedure.

System information is described below.

System information includes essential information that needs to be known by UE in order to access a BS. Accordingly, the UE needs to have received all pieces of system information before accessing the BS and needs to always have recent system information. Furthermore, system information is information that needs to be known by all pieces of UE within one cell, and thus a BS periodically transmits the system information.

In accordance with Paragraph 5.2.2 of 3GPP TS 36.331 V8.7.0 (2009-09) "Radio Resource Control (RRC); Protocol specification (Release 8)", system information is classified into a Master Information Block (MIB), a Scheduling Block (SB), and a System Information Block (SIB). The MIB enables UE to know the physical configuration of a corresponding cell, for example, a bandwidth. The SB informs information about the transmission of SIBs, for example, a transport period. The SIB is a collection of pieces of correlated system information. For example, any SIB includes only information about neighboring cells, and any SIB includes only information about an uplink radio channel used by UE.

In general, service provided from a network to UE may be classified into three types as follows. Furthermore, UE differently recognizes the type of cell depending on what service may be received. A service type is first described, and the type of cell is then described.

1) Limited service: this service provides an emergency call and an Earthquake and Tsunami Warning System (ETWS), and this service can be provided by an acceptable cell.

2) Normal service: this service means public use for common purposes, and this service can be provided by a suitable or normal cell.

3) Operator service: this service means service for a communication network service provider, and this cell can be used only by a communication network service provider, but cannot be used by a common user.

In relation to a service type provided by a cell, the type of cell can be classified as follows.

1) Acceptable cell: a cell from which UE can be provided with limited service. This cell is a cell which is not barred from a viewpoint of corresponding UE, but satisfies a cell selection criterion for the UE.

2) Suitable cell: a cell from which UE can be provided with suitable service. This cell satisfies a condition for an acceptable cell and also satisfies an additional condition. The additional condition includes that this cell needs to belong to a Public Land Mobile Network (PLMN) accessible to corresponding UE and this cell must be a cell on which a tracking area update procedure is not barred from being executed by UE. If a corresponding cell is a CSG cell, the CSG cell needs to be a cell that UE can access as a CSG member.

3) Barred cell: a cell that broadcasts that this cell is a cell barred through system information.

4) Reserved cell: a cell that broadcasts that this cell is a cell reserved through system information.

Figure 4:
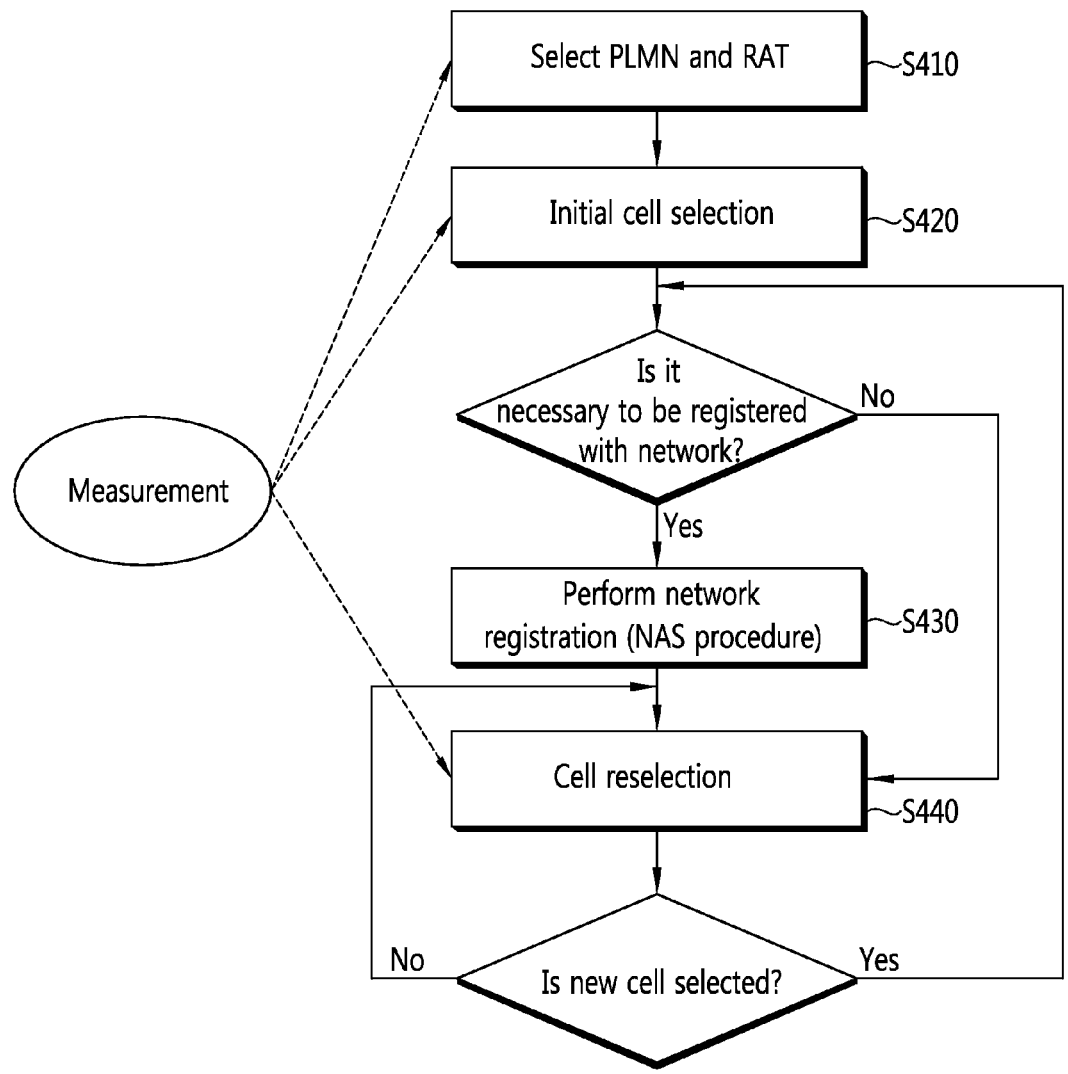
FIG. 4 is a flowchart illustrating the operation of UE in the RRC_idle state.

FIG. 4 is a flowchart illustrating the operation of UE in the RRC_idle state. FIG. 4 shows a procedure in which UE that is initially powered on is registered with a network through a cell selection process and the UE performs cell reselection, if necessary.

Referring to FIG. 4, the UE selects Radio Access Technology (RAT) for communicating with a Public Land Mobile Network (PLMN), that is, a network from which the UE is provided with service (S410). Information about the PLMN and the RAT may be selected by the user of the UE, and information stored in a Universal Subscriber Identity Module (USIM) may be used.

The UE selects a cell having the greatest value from cells whose measured BS and signal intensity or quality is greater than a specific value (S420). In this case, powered-on UE performs cell selection, which may be called initial cell selection. Cell selection procedure is described in detail later. After the cell selection, the UE receives system information that is periodically transmitted by a BS. The specific value refers to a value defined in a system in order to guarantee quality for a physical signal in data transmission/reception. Accordingly, the value may be different depending on applied RAT.

If the UE needs to be registered with a network, the UE performs a network registration procedure (S430). The UE registers its own information (e.g., IMSI) with the network in order to receive service (e.g., paging) from the network. The UE does not register its information with an accessing network whenever the UE selects a cell, but registers its information with a network if information (e.g., Tracking Area Identity (TAI)) about the network received from system information is different from information about the network which has been known to the UE.

The UE performs cell reselection based on a service environment provided by a cell, the environment of the UE, etc. (S440). If a value of the intensity or quality of a signal measured from a BS that provides service to the UE is lower than a value measured from a BS of a neighboring cell, the UE selects a cell from other cells that provide better signal characteristics than the cell of the BS that the UE has accessed. This process is called cell reselection differently from the initial cell selection of second process. Here, in order to prevent a cell from being frequently reselected depending on a change of signal characteristics, a temporal restriction condition is imposed. The cell reselection procedure is described in detail later.

Figure 5:
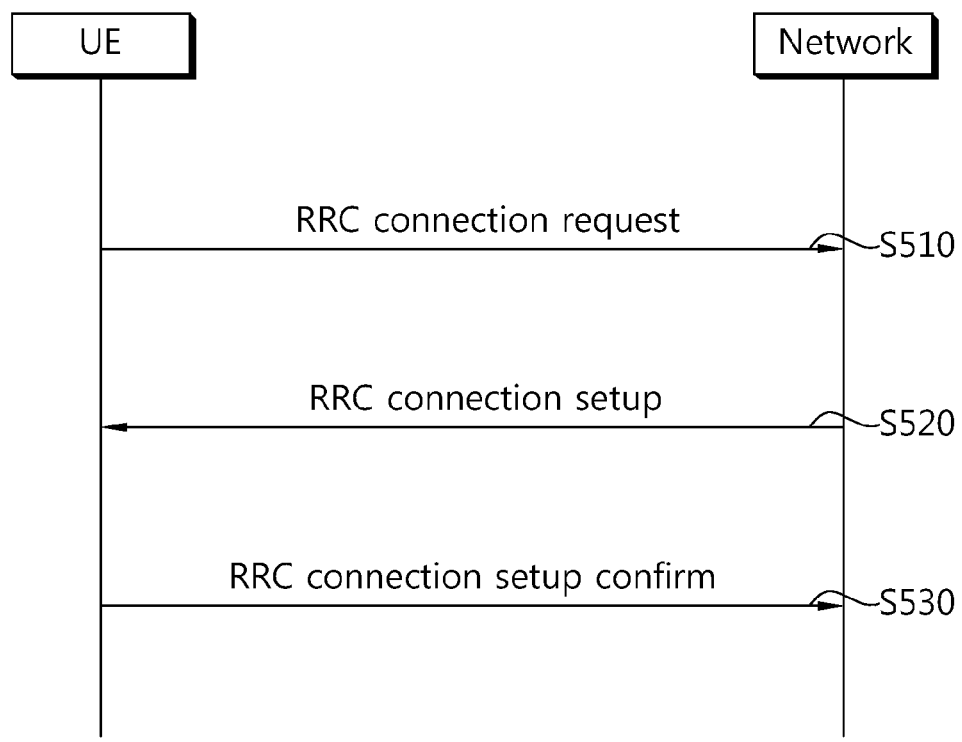
FIG. 5 is a flowchart illustrating a process of setting up an RRC connection.

FIG. 5 is a flowchart illustrating a process of setting up an RRC connection.

UE transmits an RRC connection request message, requesting an RRC connection, to a network (S510). The network transmits an RRC connection setup message in response to the RRC connection request (S520). After receiving the RRC connection setup message, the UE enters an RRC connected mode.

The UE transmits an RRC connection setup complete message, used to check the successful completion of the RRC connection setup, to the network (S530).

Figure 6:
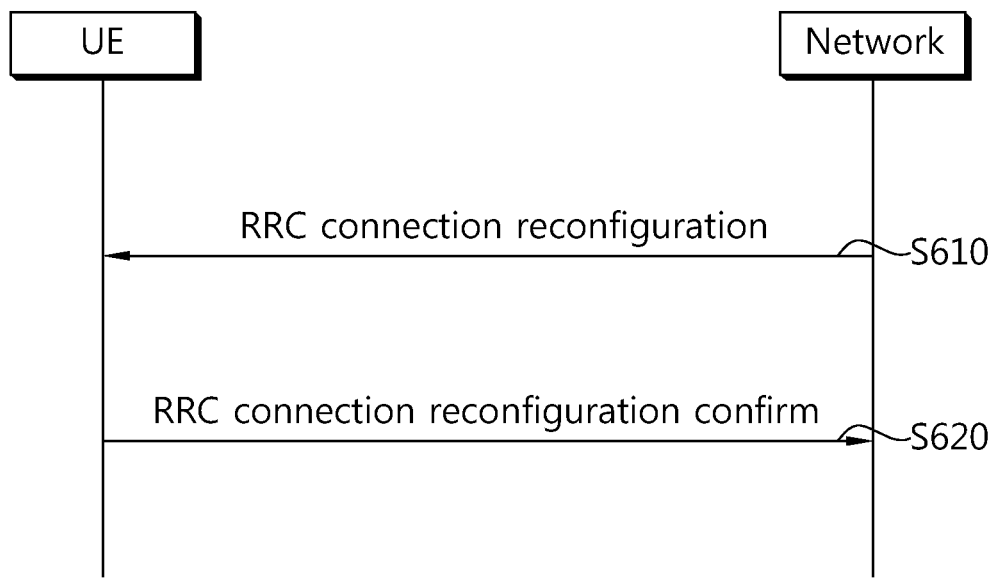
FIG. 6 is a flowchart illustrating a process of reconfiguring an RRC connection.

FIG. 6 is a flowchart illustrating a process of reconfiguring an RRC connection. An RRC connection reconfiguration is used to modify an RRC connection. This is used to set up, modify/release an RB, perform handover, and set up, modify/release measurement.

A network transmits an RRC connection reconfiguration message for modifying an RRC connection to UE (S610). The UE transmits an RRC connection reconfiguration complete message used to check the successful completion of an RRC connection reconfiguration to the network in response to the RRC connection reconfiguration (S620).

A radio link failure is described below.

UE continues to perform measurement in order to maintain the quality of a radio link to a serving cell from which service is received. The UE determines whether or not communication is impossible in a current situation due to the deterioration of quality of a radio link to a serving cell. If communication is almost impossible because the quality of a serving cell is too low, the UE determines a current situation to be a radio connection failure.

If a radio link failure is determined, the UE forgives maintaining communication with a current serving cell, selects a new cell through a cell selection (or cell reselection) procedure, and attempts an RRC connection reestablishment to the new cell.

Figure 7:
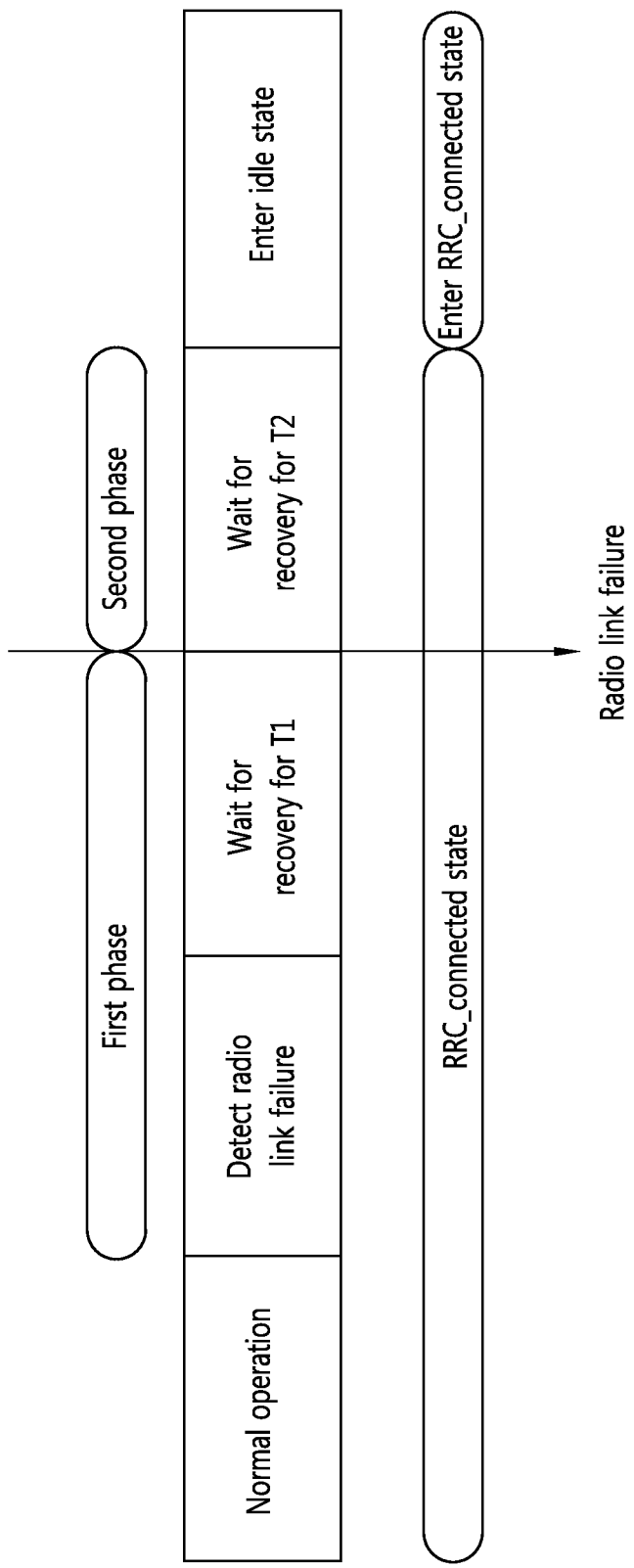
FIG. 7 is an exemplary diagram showing a radio link failure.

FIG. 7 is an exemplary diagram showing a radio link failure. An operation related to a radio link failure may be described in two phases.

In the first phase, UE performs a normal operation and checks whether or not there is a problem in a current communication link. If a problem is detected, the UE declares a radio link problem and waits for the recovery of a radio link for a first standby time T1. If the radio link is recovered before the first standby time elapses, the UE performs a normal operation again. If the radio link is not recovered until the first standby time expires, the UE declares a radio link failure and enters the second phase.

In the second phase, the UE waits for the recovery of the radio link for a second standby time T2. If the radio link is not recovered until the second standby time expires, the UE enters the RRC_idle state. Or, the UE may perform an RRC reestablishment procedure.

The RRC connection reestablishment procedure is a procedure of reestablishing an RRC connection again in the RRC_connected state. Since the UE remains in the RRC_connected state, that is, since the UE does not enter the RRC_idle state, the UE does not initialize all its radio configurations (e.g., radio bearer configurations). Instead, the UE suspends the use of all radio bearers other than an SRB0 when starting an RRC connection reconfiguration procedure. If an RRC connection reconfiguration is successful, the UE resumes the use of suspended radio bearers.

Figure 8:
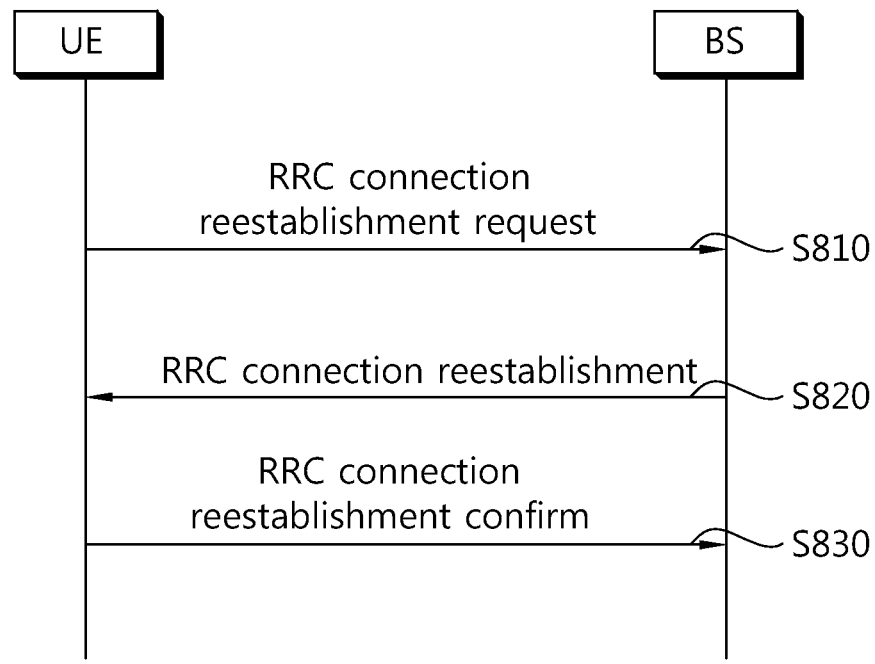
FIG. 8 is a flowchart illustrating the success of a connection reestablishment process.

FIG. 8 is a flowchart illustrating the success of a connection reestablishment process.

UE selects a cell by performing cell selection. The UE receives system information in order to receive basic parameters for cell access in the selected cell. Furthermore, the UE sends an RRC connection reestablishment request message to a BS (S810).

If the selected cell is a cell having the context of the UE, that is, a prepared cell, the BS accepts the RRC connection reestablishment request of the UE and transmits an RRC connection reestablishment message to the UE (S820). The UE transmits an RRC connection reestablishment complete message to the BS, so the RRC connection reestablishment procedure can be successful (S830).

Figure 9:
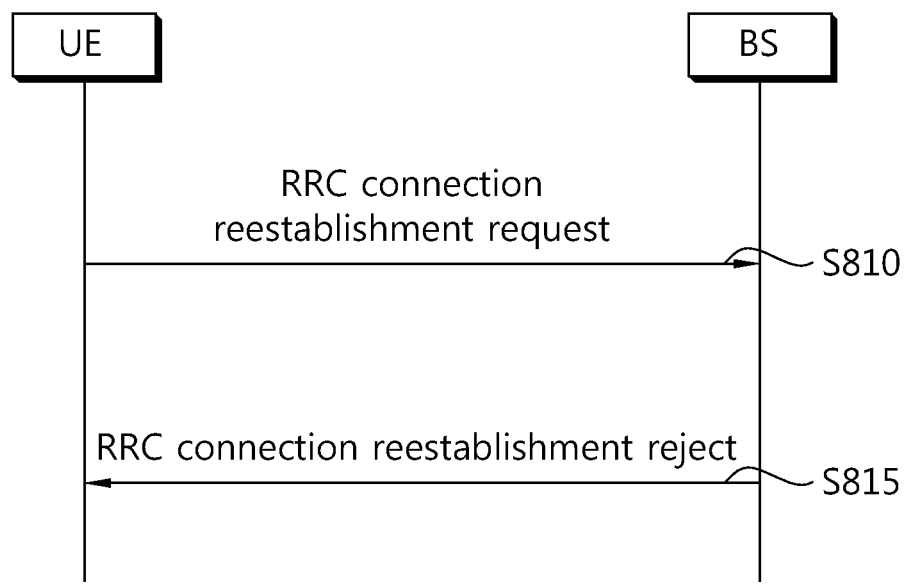
FIG. 9 is a flowchart illustrating the failure of a connection reestablishment process.

FIG. 9 is a flowchart illustrating the failure of a connection reestablishment process. UE transmits an RRC connection reestablishment request message to a BS (S810). If a selected cell is not a prepared cell, the BS transmits an RRC connection reestablishment reject message to the UE in response to the RRC connection reestablishment request (S815).

A procedure of UE selecting a cell is described in detail below.

When UE is powered on or the UE remains in a cell, the UE performs procedures for receiving service by selecting/reselecting a cell having suitable quality.

UE in the RRC_idle state always needs to select a cell having suitable quality and to be prepared to receive service through this cell. For example, UE that is just powered on needs to select a cell having suitable quality in order to be registered with a network. When the UE in the RRC_connected state enters the RRC_idle state, the UE needs to select a cell in which the UE will remain in the RRC_idle state. A process in which the UE selects a cell that satisfies any condition in order to remain in a service standby state, such as the RRC_idle state, as described above is called cell selection. An important point is that the UE needs to select a cell as rapidly as possible because cell selection is performed in the state in which the UE has not determined a cell in which the UE will remain in the RRC_idle state. Accordingly, if a cell provides the quality of a radio signal higher than a certain reference, although the cell is not a cell that provides the best quality of a radio signal to the UE, the cell may be selected in the cell selection process of the UE.

A method and procedure of UE selecting a cell in 3GPP LTE are described below with reference to 3GPP TS 36.304 V8.5.0 (2009-03) "User Equipment (UE) procedures in idle mode (Release 8)".

When UE is initially powered on, the UE searches for an available Public Land Mobile Network (PLMN) and selects a suitable PLMN from which service may be received. The PLMN is a network that is deployed or managed by a mobile network operator. Each mobile network operator manages one or more PLMNs. Each PLMN can be identified by Mobile Country Code (MCC) and Mobile Network Code (MNC). Information about the PLMN of a cell is included in system information and broadcasted. UE attempts to register a selected PLMN. If the registration is successful, the selected PLMN becomes a Registered PLMN (RPLMN). A network may signal a PLMN list to the UE. PLMNs included in the PLMN list may be considered to be the same PLMNs as RPLMNs. UE registered with a network needs to be always reachable by the network. If UE is in the ECM-CONNECTED state (identically an RRC_connected state), a network recognizes that the UE is provided with service. If the UE is in the ECM-IDLE state (identically the RRC_idle state), the situation of the UE is not valid in an eNB, but is stored in an MME. In this case, only the MME is informed of the location of the UE in the ECM-IDLE state as the granularity of a list of Tracking Areas (TAs). A single TA is identified by a Tracking Area Identity (TAI) including a PLMN identity to which the TA belongs and Tracking Area Code (TAC) that uniquely represent a TA within a PLMN.

Next, the UE selects a cell having signal quality and characteristics from which the UE can be provided with suitable service from cells provided by the selected PLMN.

A cell selection process is chiefly divided into two types.

First, as an initial cell selection process, in this process, UE does not have preliminary information about a radio channel. Accordingly, in order to find a suitable cell, the UE searches all radio channels. The UE searches each channel for the strongest cell. Next, the UE selects a corresponding cell only if it has only to find a suitable cell that satisfies a cell selection reference.

Next, the UE may select a cell using stored information or using information broadcasted by a cell. Accordingly, cell selection may be faster than an initial cell selection process. The UE selects a corresponding cell if it has only to find a cell that satisfies a cell selection reference. If a suitable cell that satisfies the cell selection reference is not found through this process, the UE performs an initial cell selection process.

After UE selects any cell through a cell selection process, the intensity or quality of a signal between the UE and a BS may be changed due to the mobility of the UE or a change of a radio environment. Accordingly, if the quality of a selected cell is deteriorated, the UE may select another cell that provides better quality. If a cell is selected again as described above, the UE selects a cell that provides better signal quality than a currently selected cell. This process is called cell reselection. In general, the cell reselection process has a basic object to select a cell that provides the best quality to UE from a viewpoint of the quality of a radio signal.

In addition to the viewpoint of the quality of a radio signal, a network can determine priority by the frequency and inform UE of the determined priority. The UE which has received the priority preferentially considers this priority to be higher than a radio signal quality reference in a cell reselection process.

There is a method of selecting or reselecting a cell based on the signal characteristics of a radio environment as described above. Upon cell reselection, in selecting a cell for reselection, the following cell reselection method may be used depending on the RAT and frequency characteristics of a cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principle of a cell reselection process is as follows.

First, UE measures the quality of a serving cell and a neighboring cell for cell reselection.

Second, cell reselection is performed based on a cell reselection reference. The cell reselection reference has the following characteristics in relation to the measurement of the serving cell and the neighboring cell.

Intra-frequency cell reselection is basically based on ranking. Ranking is a task for defining a criterion value for cell reselection evaluation and ranking cells using the criterion value in order of a higher criterion value. A cell having the best criterion is commonly called the best ranked cell. The cell criterion value is a value to which a frequency offset or a cell offset has been applied, if necessary, on the basis of a value measured by UE for a corresponding cell.

Inter-frequency cell reselection is based on frequency priority provided by a network. UE attempts to camp on a frequency having the highest frequency priority. A network may provide frequency priority that will be in common applied by pieces of UEs within a cell through broadcast signaling or may provide frequency-dedicated priority according to each piece of UE through UE-dedicated signaling.

For inter-frequency cell reselection, a network may provide UE with a parameter (e.g., a frequency-specific offset) used in cell reselection by the frequency.

For intra-frequency cell reselection or inter-frequency cell reselection, a network may provide UE with a Neighboring Cell List (NCL) used in cell reselection. The NCL includes a cell-specific parameter (e.g., a cell-specific offset) used in cell reselection.

For intra-frequency or inter-frequency cell reselection, a network may provide UE with a cell reselection black list used in cell reselection. UE does not perform cell reselection on a cell that is included in the black list Ranking performed in a cell reselection evaluation process is described below.

A ranking criterion used to assign priority to a cell is defined as in Equation 1.

$$R_s = Q_{meas,s} + Q_{hyst},$$

$$R_n = Q_{meas,n} + Q_{offset} \quad \text{[Equation 1]}$$

Here, $R_s$ is a ranking criterion for a serving cell, $R_n$ is a ranking criterion for a neighboring cell, $Q_{meas,s}$ is a quality value measured by UE in relation to a serving cell, $Q_{meas,n}$ is a quality value measured by UE in relation to a neighboring cell, $Q_{hyst}$ is a hysteresis value for ranking, and $Q_{offset}$ is an offset between two cells.

In Intra-frequency, if UE receives an offset $Q_{offsets,n}$ between a serving cell and a neighboring cell, $Q_{offset} = Q_{offsets,n}$. If UE does not receive $Q_{offsets,n}$, $Q_{offset} = 0$.

In Inter-frequency, if UE receives an offset $Q_{offsets,n}$ for a corresponding cell, $Q_{offset} = Q_{offsets,n} + Q_{frequency}$. If UE does not receive $Q_{offsets,n}$, $Q_{offset} = Q_{frequency}$.

If the ranking criterion $R_s$ of a serving cell and the ranking criterion $R_n$ of a neighboring cell are shifted in a similar state, UE may alternately reselect two cells because ranking priority is frequently changed as a result of the shift. $Q_{hyst}$ is a parameter that prevents UE from alternately reselecting two cells by giving a hysteresis in cell reselection.

UE measures $R_s$ of a serving cell and $R_n$ of a neighboring cell according to the above equation, considers a cell having the greatest ranking criterion value to be the best ranked cell, and reselects the cell.

In accordance with the reference, it may be seen that the quality of a cell functions as the most important reference in cell reselection. If a reselected cell is not a suitable cell, UE excludes a corresponding frequency or a corresponding cell from the subject of cell reselection.

Measurement and a measurement report are described below.

In a mobile communication system, the mobility support of UE is essential. Accordingly, UE consistently measures quality for a serving cell which now provides service and quality for a neighboring cell. UE reports a measurement result to a network on a suitable time, and a network provides the UE with the optimal mobility through handover, etc. Measurement for this purpose is called Radio Resource Management (RRM) Measurement.

In addition to the mobility support object, in order to provide information that may help a service provider to manage a network, UE may perform measurement for a specific object set by the network and report a measurement result thereof to the network. For example, UE may receive broadcast information about a specific cell that has been determined by a network. UE may report a cell identity of the specific cell (this is also called a global cell identity), location identity information (e.g., tracking area code) to which the specific cell belongs and/or other cell information (e.g., whether or not the specific cell is a member of a Closed Subscriber Group (CSG) cell) to a serving cell.

If UE in motion checks that the quality of a specific area is very poor through measurement, the UE may report location information and a measurement result of cells having poor quality to a network. The network may attempt to optimize the network based on a report on measurement results from pieces of UE that help the operation of the network.

In a mobile communication system whose frequency reuse factor is 1, mobility is chiefly performed between different cells in the same frequency band. Accordingly, in order to well guarantee the mobility of UE, the UE needs to be able to well measure the quality of neighboring cells having the same center frequency as a serving cell and information about the cells. As described above, measurement for a cell having the same center frequency as a serving cell is called intra-frequency measurement. UE performs intra-frequency measurement and reports a measurement result to a network on a suitable time so that the object of a corresponding measurement result is achieved.

A mobile communication service provider may manage a network using a plurality of frequency bands. If a communication system provides service through a plurality of frequency bands, in order to guarantee optimal mobility for UE, the UE needs to be able to well measure the quality of neighboring cells having a different center frequency from a serving cell and information about the cells. As described above, measurement for a cell having a different center frequency from a serving cell is called inter-frequency measurement. UE needs to be able to perform inter-frequency measurement and report a measurement result to a network on a suitable time.

If UE supports measurement for a heterogeneous network, measurement may be performed on a cell of a heterogeneous network based on a BS configuration. Such measurement for a heterogeneous network is called inter-Radio Access Technology (RAT) measurement. For example, RAT may include a UMTS Terrestrial Radio Access Network (UTRAN) and a GSM EDGE Radio Access Network (GERAN) that comply with the 3GPP standard and may also include a CDMA 2000 system that complies with the 3GPP2 standard.

Figure 10:
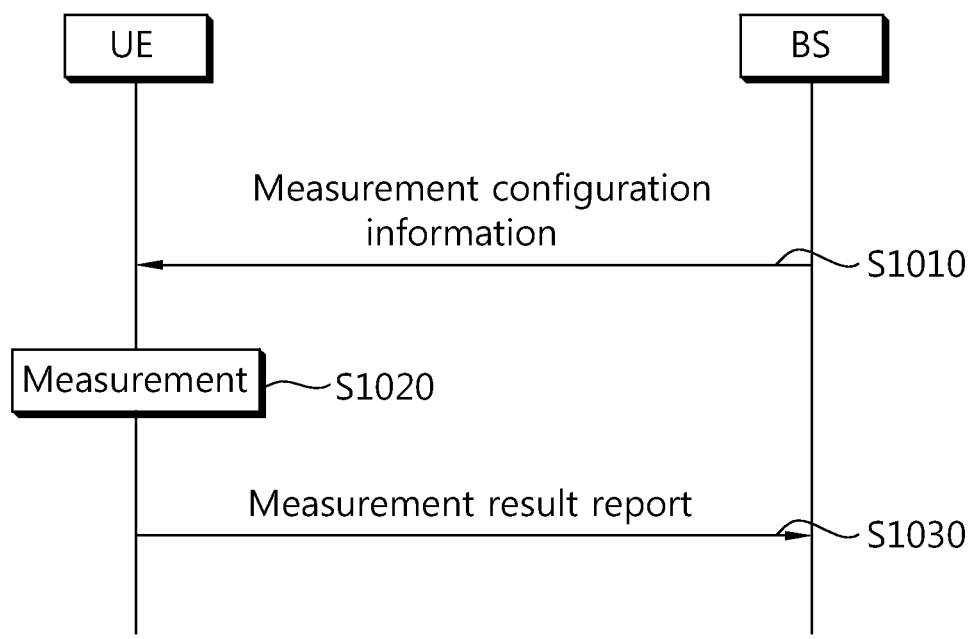
FIG. 10 is a flowchart illustrating an existing method of performing measurement.

FIG. 10 is a flowchart illustrating an existing method of performing measurement.

UE receives measurement configuration information from a BS (S1010). A message including the measurement configuration information is called a measurement configuration message. The UE performs measurement based on the measurement configuration information (S1020). The UE reports a measurement result to the BS if the measurement result satisfies a report condition within the measurement configuration information (S1030). A message including the measurement result is called a measurement report message.

The measurement configuration information may include the following information.

(1) Measurement object information: information about the object on which measurement will be performed by UE. The measurement object includes at least one of an intra-frequency measurement object that is the object of intra-cell measurement, an inter-frequency measurement object that is the object of inter-cell measurement, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a different frequency band from a serving cell, and the inter-RAT measurement object may indicate a neighboring cell having different RAT from a serving cell.

(2) Reporting configuration information: information about a report condition regarding when UE reports a measurement result and about a report type. The report condition may include information about an event or period in which a report on a measurement result is triggered. The report type is information regarding that a measurement result will be configured according to what type.

(3) Measurement identity information: information about a measurement identity, which makes UE determine to report what measurement object according to what type when in association with a measurement object and a reporting configuration. The measurement identity information is included in a measurement report message, and it may indicate that a measurement result is about what measurement object and that a measurement report has been generated under what report condition.

(4) Quantity configuration information: information about a parameter for configuring the filtering a measurement unit, a report unit and/or a measurement result value.

(5) Measurement gap information: information about a measurement gap, that is, an interval which may be used by UE for only measurement without taking data transmission to a serving cell into consideration, because DL transmission or UL transmission has not been scheduled.

In order to perform a measurement procedure, UE has a measurement object list, a measurement report configuration list, and a measurement identity list.

In 3GPP LTE, a BS may configure only one measurement object for one frequency band regarding UE. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)", events triggered by a measurement report, such as those in the following table, are defined.

TABLE 1

| Events | Report Conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than serving |
| Event A5 | Serving becomes worse than threshold1 and neigbour becomes better than threshold2 |
| Event B1 | Inter RAT neighbor becomes better than threshold |
| Event B2 | Serving becomes worse than threshold1 and inter RAT neighbor becomes better than threshold2 |

If the measurement report of UE satisfies a set event, the UE transmits a measurement report message to a BS.

Figure 11:
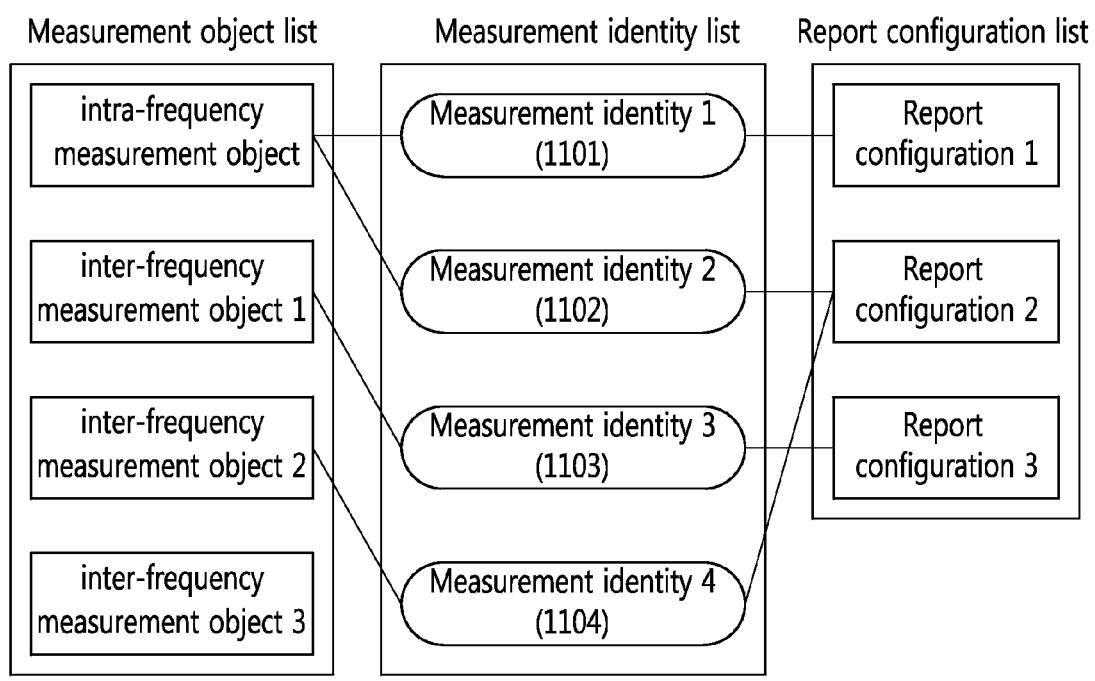
FIG. 11 shows an example in which a measurement identity is deleted.

FIG. 11 shows an example of a measurement configuration configured for UE.

First, a measurement identity 1(1101) connects an intra-frequency measurement object and a reporting configuration 1. UE performs intra-frequency measurement, and the reporting configuration 1 is used to determine a reference and report type for a measurement result report.

Like the measurement identity 1(1101), a measurement identity 2(1102) is connected to the intra-frequency measurement object, but the measurement identity 2(1102) connects the intra-frequency measurement object and a reporting configuration 2. UE performs intra-frequency measurement, and the reporting configuration 2 is used to determine a reference and a report type for a measurement result report.

Based on the measurement identity 1(1101) and the measurement identity 2(1102), UE transmits a measurement result of the intra-frequency measurement object if the measurement result satisfies any one of the reporting configuration 1 and the reporting configuration 2.

A measurement identity 3(1103) connects an inter-frequency measurement object 1 and a reporting configuration 3. UE reports a measurement result of the inter-frequency measurement object 1 if the measurement result satisfies a report condition included in the reporting configuration 1.

A measurement identity 4(1104) connects an inter-frequency measurement object 2 and the reporting configuration 2. UE reports a measurement result of the inter-frequency measurement object 2 if the measurement result satisfies a report condition included in the reporting configuration 2.

Meanwhile, a measurement object, a reporting configuration and/or a measurement identity may be added, changed and/or deleted. This may be indicated when a BS transmits a new measurement configuration message to UE or transmits a measurement configuration change message to the UE.

Figure 12:
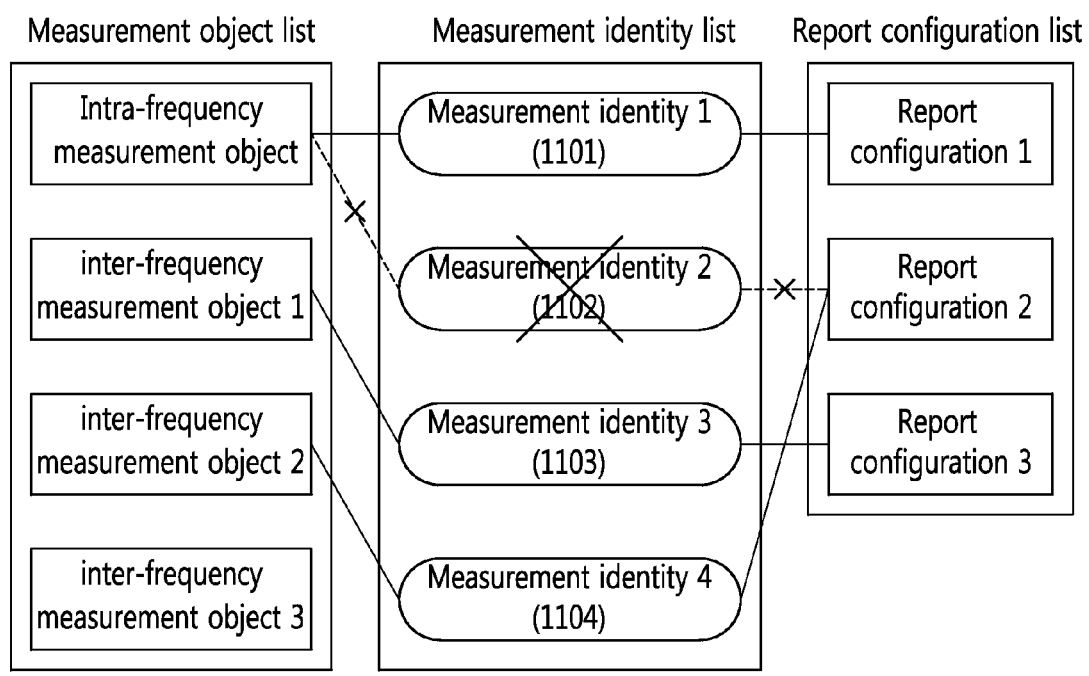
FIG. 12 shows an example in which a measurement object is deleted.

FIG. 12 shows an example in which a measurement identity is deleted. When a measurement identity 2(1102) is deleted, measurement for a measurement object associated with the measurement identity 2(1102) is suspended, and a measurement report is not also transmitted. A measurement object or a reporting configuration associated with the deleted measurement identity may not be changed.

Figure 13:
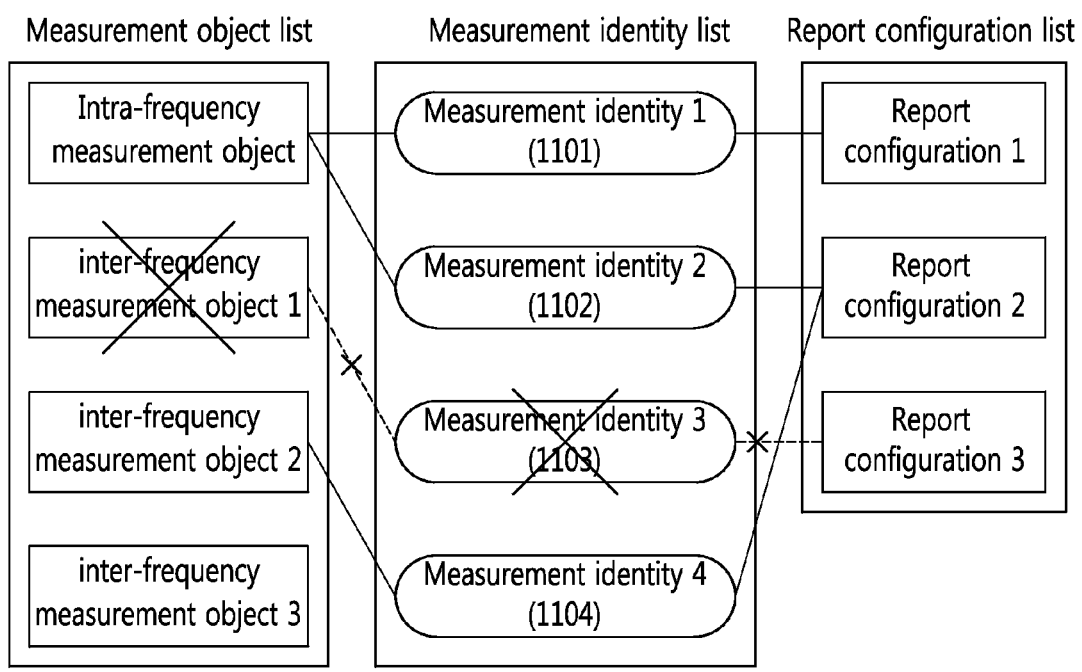
FIG. 13 is a flowchart illustrating an existing measurement procedure.

FIG. 13 shows an example in which a measurement object is deleted. When an inter-frequency measurement object 1 is deleted, UE also deletes an associated measurement identity 3(1103). Measurement for the inter-frequency measurement object 1 is suspended, and a measurement report is also not transmitted. However, a reporting configuration associated with the deleted intra-frequency measurement object 1 may not be changed or deleted.

When a reporting configuration is removed, UE also removes an associated measurement identity. UE suspends measurement for a measurement object associated by the associated measurement identity. However, a measurement object associated with the deleted reporting configuration may not be changed or deleted.

A measurement report may include a measurement identity, the measured quality of a serving cell, and a measurement result of a neighboring cell. The measurement identity identifies a measurement object whose measurement report has been triggered. The measurement result of the neighboring cell may include a cell identity and measured quality of the neighboring cell. The measured quality may include at least one of Reference Signal Received Power (RSRP) and Reference Signal Received Quality (RSRQ).

A Minimization Drive Test (MDT) is described below.

An MDT enables UE to perform measurement and report a result thereof instead of a drive test in which conventional service providers measure the quality of cells using vehicles for cell coverage optimization. Coverage varies depending on the location of a BS, the deployment of peripheral buildings, and a use environment of a user. Accordingly, a service provider needs to periodically perform a drive test, which consumes lots of costs and resources. In order to overcome the disadvantages, there is proposed an MDT in which a service provider measures coverage using UE.

A service provider may write a coverage map, indicating whether or not service is possible over the entire area to which service is provided by a service provider and a distribution of QoS, by synthesizing MDT measurement values received from several pieces of UE and use the written coverage map in network operations and optimization. For example, when a report on a coverage problem for a specific area is received from UE, a service provider may enlarge the coverage of a corresponding area cell by increasing the transmission power of a BS that provides service to the corresponding area. The time and cost necessary for network optimization can be minimized through such a method.

An MDT has been produced based on the framework of a tracking function, that is, one of the tools of an operator for Operation, Administration, and Maintenance (OAM). The tracking function provides an operator with the ability to perform tracking and to log the behaviors of UE and thus can enable the operator to determine the major cause of a function failure on the UE side. Traced data is collected over a network, which is called a Trace Collection Entity (TCE). An operator uses data collected in a TCE for analysis and evaluation. A tracking function used for an MDT includes signaling based on a tracking function and management based on tracking function. Signaling based on a tracking function is used to activate an MDT task toward specific UE, whereas management based on tracking functions is used to activate an MDT task without being limited to specific UE.

An MDT may be divided into two types: a logged MDT and an immediate MDT depending on whether UE reports measured and stored log data in a non-real time or in real time. The logged MDT is a method of UE performing MDT measurement, logging corresponding data, and sending the logged data to a network. In contrast, the immediate MDT is a method of UE performing MDT measurement and immediately sending corresponding data to a network. In accordance with the logged MDT, UE performs MDT measurement in the RRC_idle state. In accordance with the immediate MDT, UE performs MDT measurement in the RRC_connected state.

Figure 14:
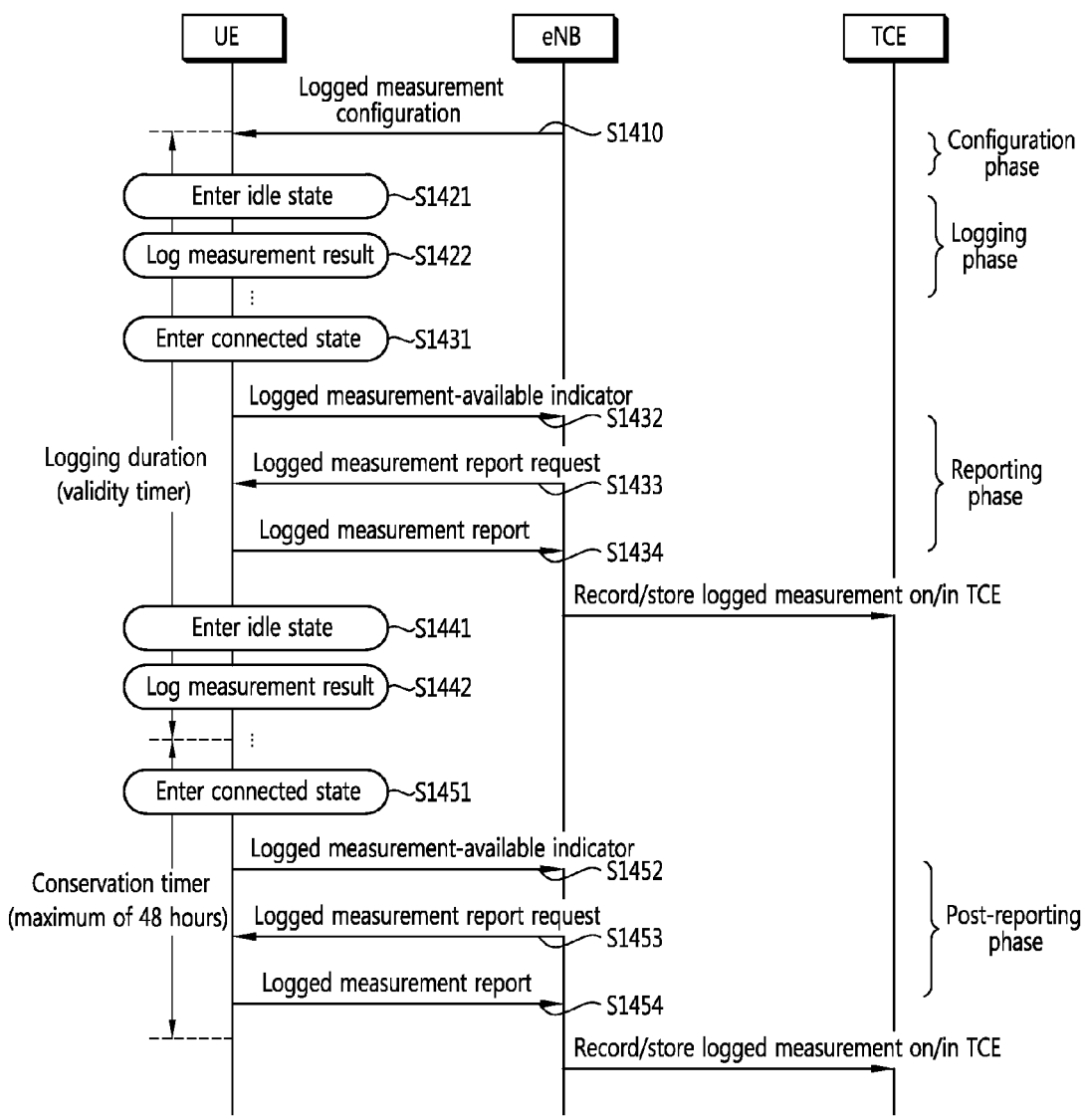
FIG. 14 is a flowchart illustrating a method of performing a logged MDT.

FIG. 14 is a flowchart illustrating a method of performing a logged MDT.

Referring to FIG. 14, UE receives a logged measurement configuration (S1410). The logged measurement configuration may be included in an RRC message and transmitted through a downlink control channel. The logged measurement configuration may include at least one of a TCE ID, information about a reference time that is a basis for logging, logging duration, a logging interval, and information about an area configuration. The logging interval indicates an interval in which a measurement result is stored. The logging duration indicates duration for which UE performs a logged MDT. The reference time indicates a reference time for duration for which a logged MDT is performed. The area configuration indicates an area that has been requested to be logged by UE.

Meanwhile, UE initiates a validity timer when a logged measurement configuration is received. The validity timer means the lifetime of the logged measurement configuration, which may be specified by information about logging duration. The duration of the validity timer may indicate the validity of measurement results owned by UE as well as the valid lifetime of a logged measurement configuration.

A procedure in which UE performs a logged measurement configuration and a corresponding overall procedure is performed as described above is called a configuration phase.

When the UE enters the RRC_idle state (S1421), the UE logs the measurement result while the validity timer is driven (S1422). A measurement result value may include RSRP, RSRQ, Received Signal Code Power (RSCP), Ec/No, etc. Information on which a measurement result has been logged is called logged measurement. A temporal interval in which UE logs a measurement result one or more times is called a logging phase.

The execution of a logged MDT based on a logged measurement configuration by UE may vary depending on the location of the UE.

Figure 15:
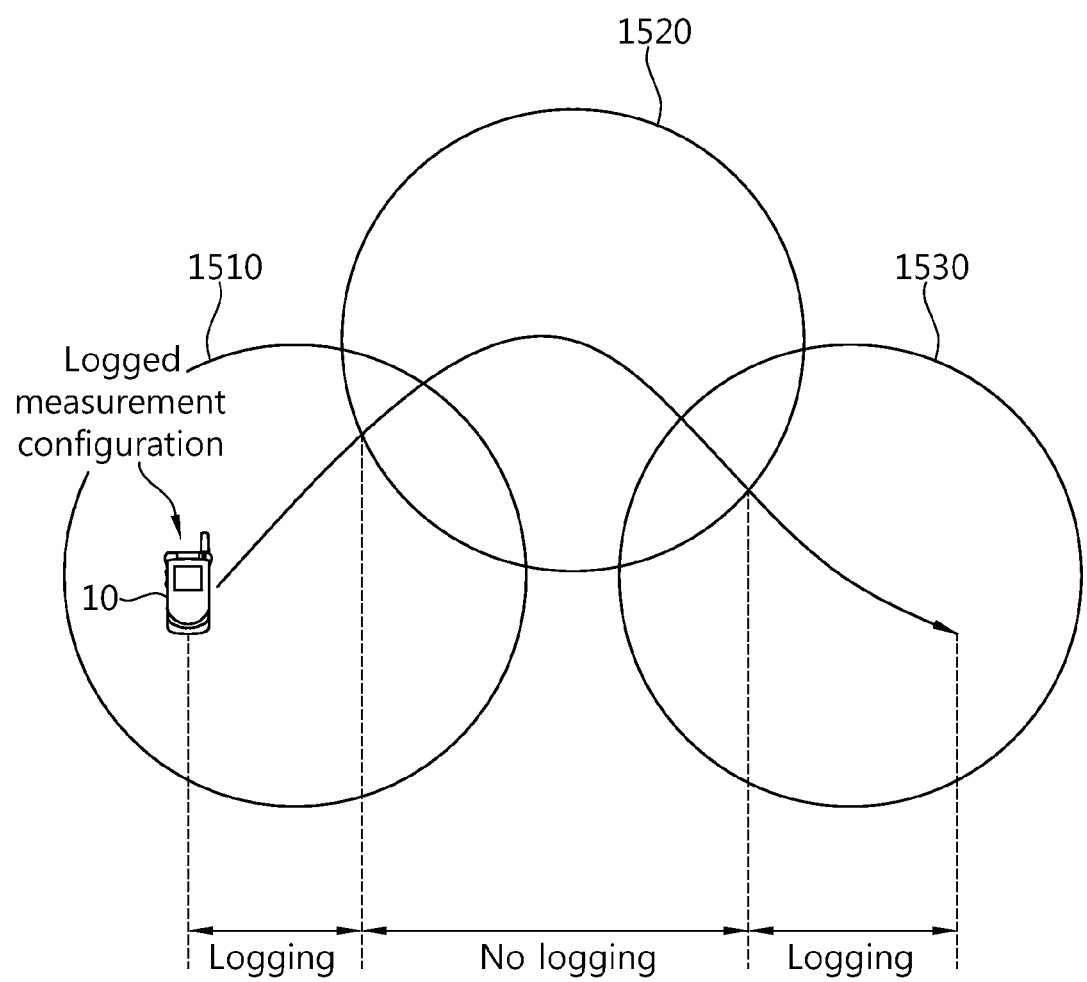
FIG. 15 is a diagram showing an example of logged MDT measurement according to a logging area.

FIG. 15 is a diagram showing an example of a logged MDT according to a logging area.

A network may configure a logging area that is an area in which UE has to log. The logging area may be represented as a cell list or a tracking area/location area list. If a logging area is configured in UE, the UE suspends logging when the UE gets out of the logging area.

Referring to FIG. 15, a first area 1510 and a third area 1530 are areas configured as logging areas, and a second area 1520 is an area in which logging is not permitted. UE performs logging in the first area 1510, but does not perform logging in the second area 1520. UE performs logging again when the UE moves from the second area 1520 to the third area 1530.

Figure 16:
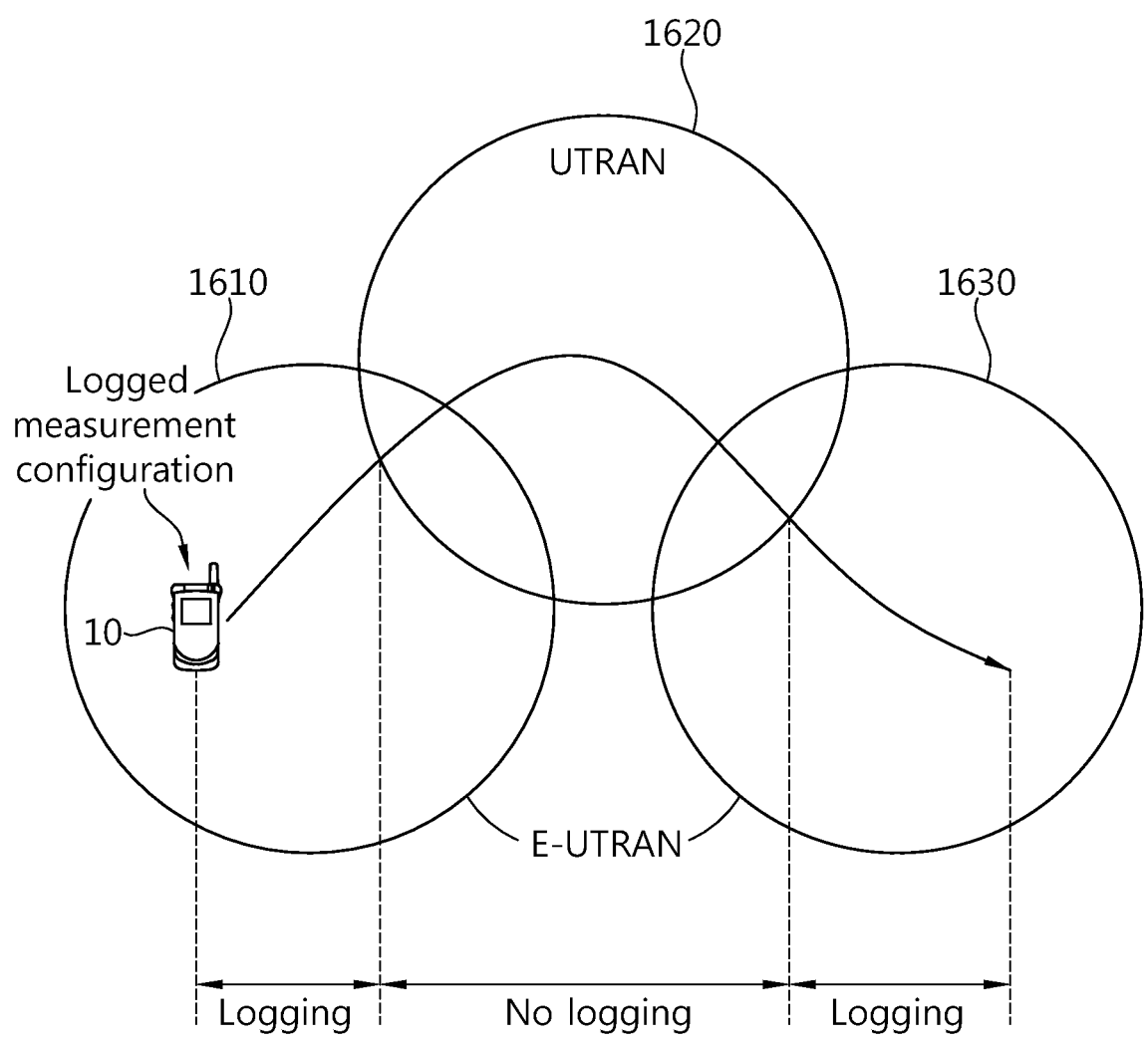
FIG. 16 is a diagram showing an example of logged MDT measurement according to a change of RAT.

FIG. 16 is a diagram showing an example of a logged MDT according to a change of RAT.

UE performs logging only when the UE camps on RAT from which a logged measurement configuration has been received and suspends logging in another RAT. However, the UE may log cell information about other RATs in addition to camp-on RAT.

A first area 1610 and a third area 1630 are E-UTRAN areas, and a second area 1620 is a UTRAN area. A logged measurement configuration is received from the E-UTRAN. When UE enters the second area 1620, the UE does not perform MDT measurement.

Referring back to FIG. 14, the UE enters the RRC_connected state (S1431). If logged measurement to be reported is present, the UE informs an eNB that the logged measurement to be reported is present (S1432). The UE may inform the eNB that the logged measurement is present when an RRC connection is established, an RRC connection is reestablished, or an RRC connection is reconfigured. Furthermore, if the UE performs handover, the UE may inform a handover target cell of a presence of the logged measurement. Informing, by the UE, the eNB that the logged measurement is present may include including a logged measurement-available indicator, that is, indication information informing that the logged measurement is present, in an RRC message transmitted from the UE to the eNB and sending the RRC message. The RRC message may be an RRC connection configuration complete message, an RRC connection reestablishment complete message, an RRC reconfiguration complete message, or a handover complete message.

When the eNB receives a signal informing that the logged measurement is present from the UE, the eNB request the UE to report logged measurement (S1433). Requesting the report on the logged measurement may include including a logged measurement report request parameter regarding information indicative of the request in an RRC message and sending the RRC message. The RRC message may be a UE information request message.

When the UE receives the request to report the logged measurement from the eNB, the UE reports the logged measurement to the eNB (S1434). Reporting the logged measurement to the eNB may include including the logged measurement report, including pieces of logged measurement, in an RRC message and sending the RRC message to the eNB. The RRC message may be a UE information report message. In reporting the logged measurement, the UE may report all or some of pieces of logged measurement owned by the UE on a report time point to the eNB. If the UE reports some of pieces of logged measurement, the reported pieces of logged measurement may be discarded.

A phase of a process in which the UE informs the eNB that the logged measurement is present, receives a request to report the logged measurement from the eNB, and reports the logged measurement is performed as described above is called a report phase.

A radio environment is chiefly measured by the UE while a logged MDT is performed. MDT measurement may include a cell identity and the signal quality and/or signal intensity of the cell. MDT measurement may include a measurement time and a measurement place. The following table illustrates contents logged by UE.

TABLE 2

| Parameter (set) | Contents |
| --- | --- |
| Serving cell identity | Global cell identity of a serving cell |
| Measurement result of serving cell | Measured RSRP of serving cell<br>Measured RSRQ of serving cell |
| Measurement result of neighbor cell | Cell identities of measured E-UTRA cells,<br>Measurement results of UTRA cells<br>Cell identities of measured UTRA cells,<br>Measurement results of UTRA cells<br>Cell identities of measured GERAN cells,<br>Measurement results of GERAN cells<br>Cell identities of measured CDMA2000 cells,<br>Measurement results of CDMA200 cells |
| Time stamp | Time of logging measurement result, calculated (current time-reference time), calculated in seconds |
| Location information | Detailed location information of logging time point |

Information logged at different logging time points can be classified and stored according to different log entries.

Figure 17:
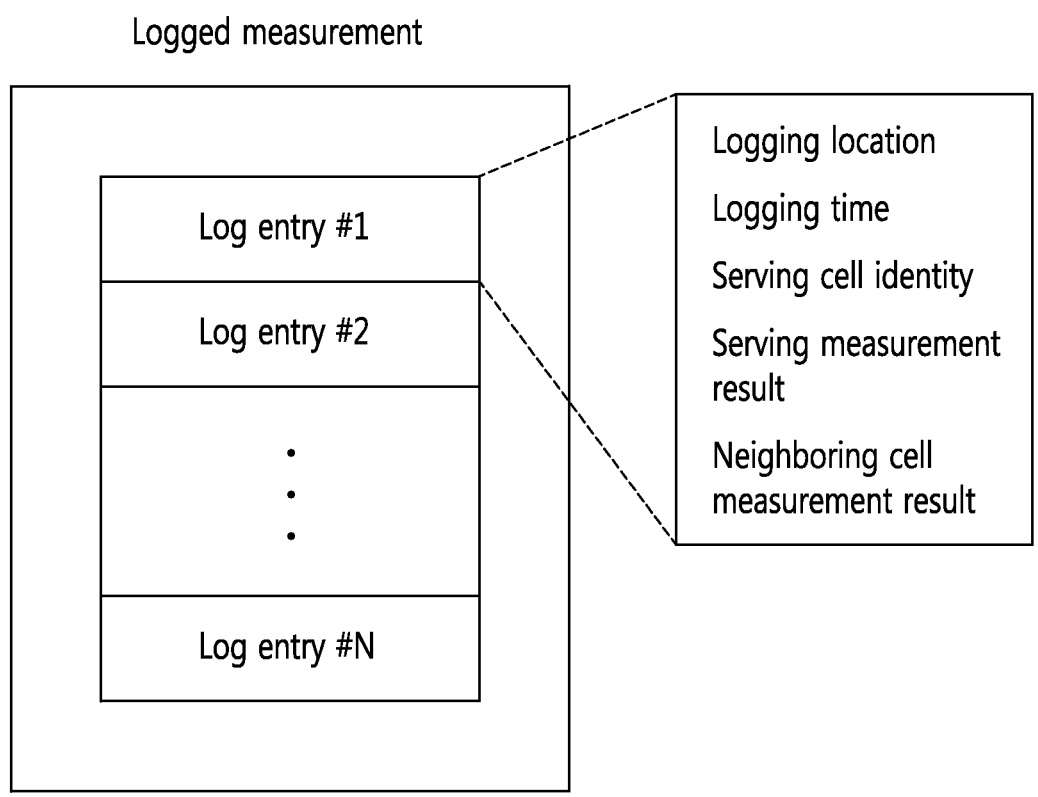
FIG. 17 is a diagram showing an example of logged measurement.

FIG. 17 is a diagram showing an example of logged measurement.

Logged measurement includes one or more log entries.

The log entry includes a logging location, a logging time, a serving cell identity, a serving cell measurement result, and a neighboring cell measurement result.

The logging location indicates the location where UE has performed measurement. The logging time indicates the time when UE has performed measurement. Pieces of information logged at different logging times are stored in different log entries.

The serving cell identity may include a cell identity in the layer 3, which is called a Global Cell Identity (GCI). The GCI is a set of a Physical Cell Identity (PCI) and a PLMN identity.

Meanwhile, UE may perform logging by analyzing criteria related to the performance of UE in addition to a radio environment. For example, the criteria related to the performance of UE may include a throughput, an erroneous transmission/reception rate, etc.

Referring back to FIG. 14, the aforementioned logging phase and report phase may be present in plural times for logging duration (S1441, S1442).

The eNB may record/store the logged measurement on/in a TCE when the logged measurement is reported.

If the UE has logged measurement that has not been reported after the validity timer expires, that is, after the logging duration elapses, the UE performs a procedure for reporting the logged measurement to the eNB. A phase in which the overall procedure for the procedure is called a post-reporting phase.

When the logging duration expires, the UE discards the logged measurement configuration and initiates a conservation timer. After the logging duration is terminated, the UE suspends MDT measurement. However, the already logged measurement remains intact without being discarded. The conservation timer indicates the lifetime of the remaining logged measurement.

When the UE enters the RRC_connected state (S1451) before the conservation timer expires, the UE may report logged measurement to the eNB. In this case, the aforementioned procedure for a logged measurement report may be performed (S1452, S1453, S1454). When the conservation timer expires, the remaining logged measurement may be discarded. When the logged measurement is reported, the eNB may record/store the logged measurement on/in the TCE.

The conservation timer may be fixed to a predetermined value in the UE and may be previously set in the UE. For example, a value of the conservation timer may be 48 hours. Or, a value of the conservation timer may be included in the logged measurement configuration and transferred to the UE or may be included in a different RRC message and transferred to the UE.

Meanwhile, when a new logged measurement configuration is transferred to the UE, the UE may update an existing logged measurement configuration into the newly obtained logged measurement configuration. In this case, the validity timer can be started again from the time when the logged measurement configuration is newly received. Furthermore, logged measurement based on the previous logged measurement configuration may be discarded.

Figure 18:
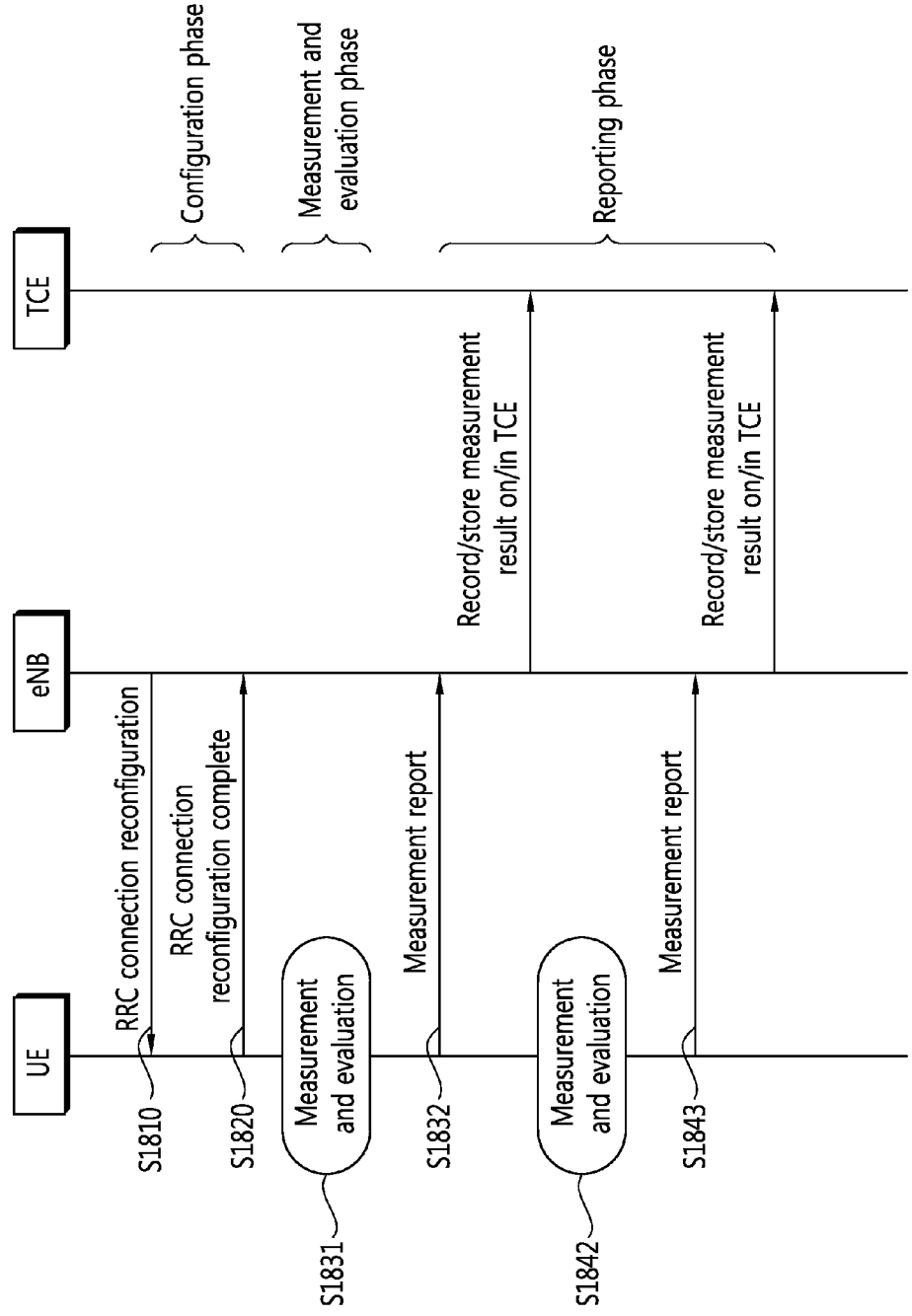
FIG. 18 is a diagram showing an example of an immediate MDT.

FIG. 18 is a diagram showing an example of an immediate MDT. The immediate MDT is based on a Radio Resource Management (RRM) measurement and report mechanism. In addition, information related to the location upon a measurement report is added and reported to an eNB.

Referring to FIG. 18, UE receives an RRC connection reconfiguration message (S1810) and transmits an RRC connection reconfiguration complete message (S1820). Thus, the UE enters the RRC_connected state. The UE may receive a measurement configuration by receiving the RRC connection reconfiguration message. In the example of FIG. 18, the measurement configuration has been illustrated as being received through the RRC connection reconfiguration message, but the measurement configuration may be included in a different RRC message and transmitted.

The UE performs measurement and evaluation in the RRC_connected state (S1831) and reports a measurement result to the eNB (S1832). In the immediate MDT, the measurement result may provide precise location information, as possible, as in the example of location information provided by a Global Navigation Satellite System (GNSS). For location measurement, such as an RF fingerprint, the measurement result may provide measurement information about a neighboring cell, which may be used to determine the location of UE.

From FIG. 18, it may be seen that even after the executed measurement and evaluation (S1831) and the report (S1832), the UE reports a measurement result (S1843) to the eNB right after performing measurement and evaluation (S1842). This is the biggest difference between the logged MDT and the immediate MDT.

An H(e)NB is described below.

Mobile communication service may also be provided through a person, a specific service provider, or a BS owned by a group in addition to a mobile communication network service provider. Such as BS is called a Home NB (HNB) or a Home eNB (HeNB). In the following description, an HNB and an HeNB are collectively called an HeNB. A basic object of an HeNB is to provide specific service to only a Closed Subscriber Group (CSG). Service may also be provided to other users in addition to a CSG depending on the configuration of an operation mode of an HeNB.

Figure 19:
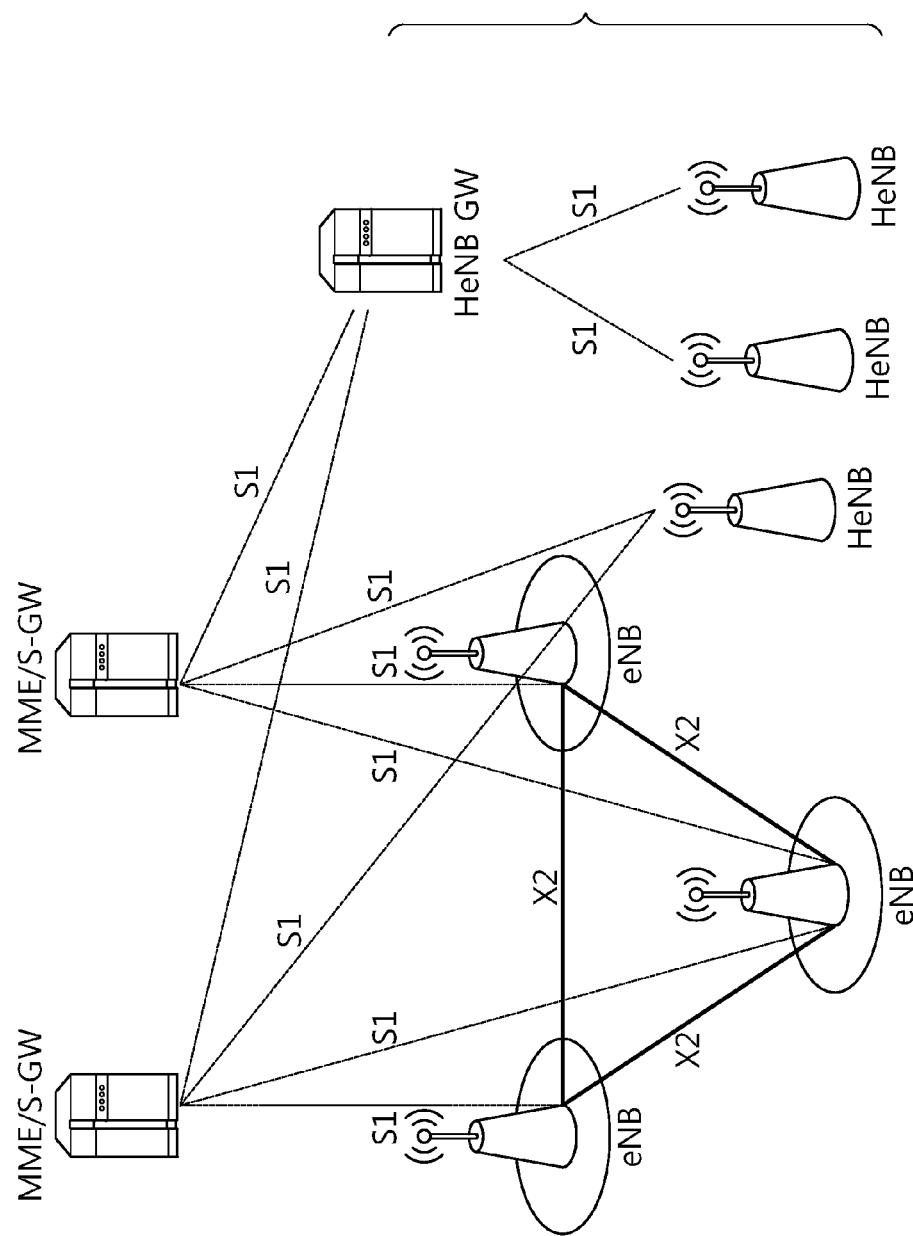
FIG. 19 is a flowchart illustrating an example of a method of performing logged MDT measurement based on a PLMN scope in accordance with an embodiment of the present invention.

FIG. 19 is a diagram showing an example of a wireless communication system showing the operation of an HeNB.

Referring to FIG. 19, as described above, a Home eNB gateway (HeNB GW) may be managed in order to serve an HeNB. HeNBs are connected to an EPC through an HeNB GW or are directly connected to the EPC. The HeNB GW appears to be common to an MME. The HeNB GW appears to be an MME to an HeNB. Accordingly, an S1 interface is connected between the HeNB and the HeNB GW, and the HeNB GW and the EPC are also connected through the S1 interface. Furthermore, if the HeNB and the EPC are directly connected, they are connected by the S1 interface. Most of the functions of the HeNB are the same as those of a common eNB.

In general, an HeNB has lower radio transmission output than an eNB owned by a mobile communication network service provider. Accordingly, service coverage provided by the HeNB is commonly smaller than service coverage provided by the eNB. For reason of such characteristics, a cell provided by the HeNB is classified as a femto cell as compared with a macro cell provided by the eNB from a viewpoint of service coverage. Meanwhile, from a viewpoint of provided service, when an HeNB provides service to only a CSG group, a cell provided by the HeNB is called a CSG cell.

Each CSG has a unique identity number, and the identity number is called a CSG identity (CSG ID). UE may have a list of CSGs to which the UE belongs as a member, and the list of CSGs may be changed in response to a request from the UE or a command of a network. In general, one HeNB may support one CSG.

An HeNB transfers the CSG ID of a CSG supported by the HeNB through system information such that only member UE of the corresponding CSG may access the HeNB. When detecting a CSG cell, the UE may check that the CSG cell supports what CSG by reading the CSG ID included in the system information. After reading the CSG ID, the UE may consider the corresponding cell to be a cell that the UE may access only when the UE is a member of the corresponding CSG cell.

An HeNB does not need to always allow only CSG UE to access thereto. UE not a member of a CSG can be allowed to access the HeNB depending on the configuration setting of the HeNB. What UE will be allowed to access the HeNB is changed depending on the configuration setting of the HeNB. Here, the configuration setting means the configuration of an operation mode of the HeNB. The operation mode of the HeNB is classified into three types as follows depending on whether service is provided to what UE.

Closed access mode: mode in which service is provided to only a specific CSG member. An HeNB provides a CSG cell.

Open access mode: mode in which service is provided without restriction to a specific CSG member like in a common eNB. An HeNB provides a common cell not a CSG cell.

Hybrid access mode: mode in which CSG service can be provided to a specific CSG member and service is also provided to a non-CSG member like in a common cell. A cell is recognized as a CSG cell by CSG member UE and recognized as a common cell by non-CSG member UE. Such a cell is called a hybrid cell.

An HeNB informs UE whether or not a cell served by the HeNB is a common cell, that is, a CSG cell, so that the UE is aware whether or not the UE can access the corresponding cell. An HeNB operating in the Closed access mode broadcasts that the HeNB is a CSG cell through system information. An HeNB operating in the Open access mode broadcasts that the HeNB is not a CSG cell through system information. As described above, a CSG indicator of 1 bit, indicating whether or not a cell served by the HeNB is a CSG cell, is included in the system information. For example, a CSG cell is broadcasted by setting a CSG indicator to TRUE. If a served cell is not a CSG cell, a CSG indicator may be set to FALSE, or a method of omitting the transmission of a CSG indicator may be used. Since UE needs to be able to distinguish a common cell provided by an eNB from a CSG cell, a common eNB also transmits a CSG indicator so that the UE is aware that a cell type provided by the eNB is a common cell. A common eNB may not send a CSG indicator so that UE can be aware that a cell type provided by the common eNB is a common cell. Table 3 shows CSG-related parameters transmitted by corresponding cells by the cell type. Table 4 shows the type of UE that is allowed for access for each cell type.

TABLE 3

|  | CSG cell | Common cell |
| --- | --- | --- |
| CSG indicator | Indicted as 'CSG cell' | Indicted as 'non-CSG cell' or not transmitted |
| CSG ID | Send supported CSG ID | Not transmitted |

TABLE 4

|  | CSG cell | Common cell |
| --- | --- | --- |
| UE not supporting CSG | Access impossible | Access possible |
| Non-CSG member UE | Access impossible | Access possible |
| Member CSG UE | Access possible | Access possible |

Inter-Cell Interference Coordination (ICIC) is described below.

ICIC is a task for operating radio resources so that control of inter-cell interference can be maintained. An ICIC mechanism may be divided into frequency domain ICIC and time domain ICIC. ICIC includes a multiple cell Radio Resource Management (RRM) function that needs to take information from multiple cells into consideration.

An interfering cell is a cell that provides interference. The interfering cell is also called an aggressor cell.

An interfered cell is a cell that is influenced by interference from an interfering cell. The interfered cell is also called a victim cell.

The frequency domain ICIC coordinates the use of frequency domain resources (e.g., a Resource Block (RB)) between multiple cells.

The time domain ICIC coordinates time domain resources (e.g., a subframe) between multiple cells. For the time domain ICIC, an Operations, Administration and Maintenance (OAM) configuration called an Almost Blank Subframe (ABS) pattern may be used. An ABS in an interfering cell is used to protect resources in a subframe in an interfered cell which receives strong inter-cell interference. The ABS is a subframe having reduced transmission power (or zero transmission power) on a physical channel or reduced activities.

A pattern based on an ABS is known to UE, which restricts UE measurement. This is called a measurement resource restriction. The ABS pattern refers to information indicating that which subframe is an ABS within one or more radio frames. The ABS pattern may be implemented in a bitmap type. The first/leftmost bit of a bitmap sequence that forms the ABS pattern is a bit for a subframe index 0. If a specific bit of the bitmap sequence is set to a '1' value, a subframe corresponding to the bit may be implemented so that it can be used for the measurement.

There are three types of measurement resource restriction patterns depending on a measured cell (e.g., a serving cell or a neighboring cell) and a measurement type (e.g., Radio Resource Management (RRM), Radio Link Measurement (RLM), and Channel State Information (CSI)).

An 'ABS pattern 1' is used for an RRM/RLM measurement resource restriction to a serving cell. An eNB may inform UE of information about the ABS pattern 1 when an RB is configured/modified/released or when an MAC/PHY configuration is modified.

An 'ABS pattern 2' is used for an RRM measurement resource restriction to a neighboring cell which operates in the same frequency as a serving cell. Accordingly, the ABS pattern 2, together with pattern information, may provide UE with a list of neighboring cells to be measured. The ABS pattern 2 may be included in a measurement configuration for a measurement object. If a cell list is not present, a measurement resource restriction may be applied to all neighboring cells of an intra-frequency.

An 'ABS pattern 3' is used for a resource restriction to the CSI measurement of a serving cell. The ABS pattern 3 may be included in a message for configuring a CSI report.

For ICIC, two types of scenarios: a CSG scenario and a pico scenario are taken into consideration.

Figure 20:
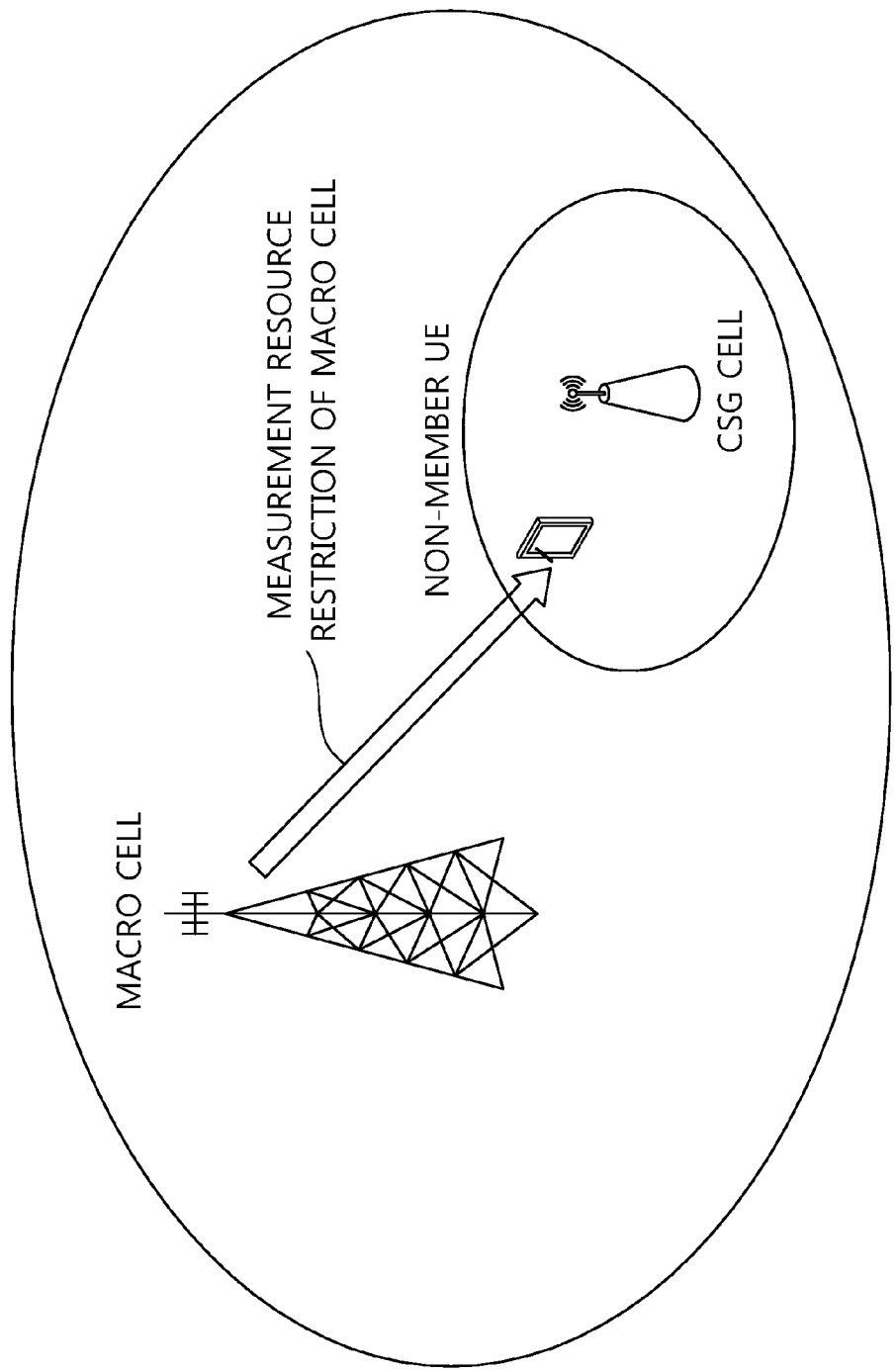
FIG. 20 illustrates a CSG scenario.

FIG. 20 illustrates a CSG scenario.

A CSG cell refers to a cell that is accessible to only a specific subscriber. Non-member UE is UE not a member of a CSG cell and is UE unable to access a CSG cell. A CSG cell not accessible to UE is called a non-member CSG cell. A macro cell refers to the serving cell of non-member UE. The coverage of a CSG cell and the coverage of a macro cell are said to be partially or fully overlapped with each other.

Major interference conditions are generated when non-member UE is placed in the close proximity of a CSG cell. From a standpoint of non-member UE, an interfering cell is a CSG cell, and a macro cell is an interfered cell. The time domain ICIC is used for non-member UE to continue to receive service in a macro cell.

In an RRC_connected state, when detecting that non-member UE belongs to strong interference from a CSG cell, a network may configure a measurement resource restriction. Furthermore, in order to facilitate mobility from a macro cell, a network may configure an RRM measurement resource restriction to a neighboring cell. If UE is no longer subject to severe interference from a CSG cell, a network may release RRM/RLM/CSI measurement resource restrictions.

UE may use a measurement resource restriction configured for RRM, RLM, and CSI measurement. That is, the UE may use resources for RLM in an ABS and perform measurement for RLM and CSI measurement in an ABS.

A network may configure low-interference radio resources according to a measurement resource restriction in which a CSG cell has been configured so that the low-interference radio resources are not used. That is, the CSG cell may not transmit or receive data in an ABS.

Figure 21:
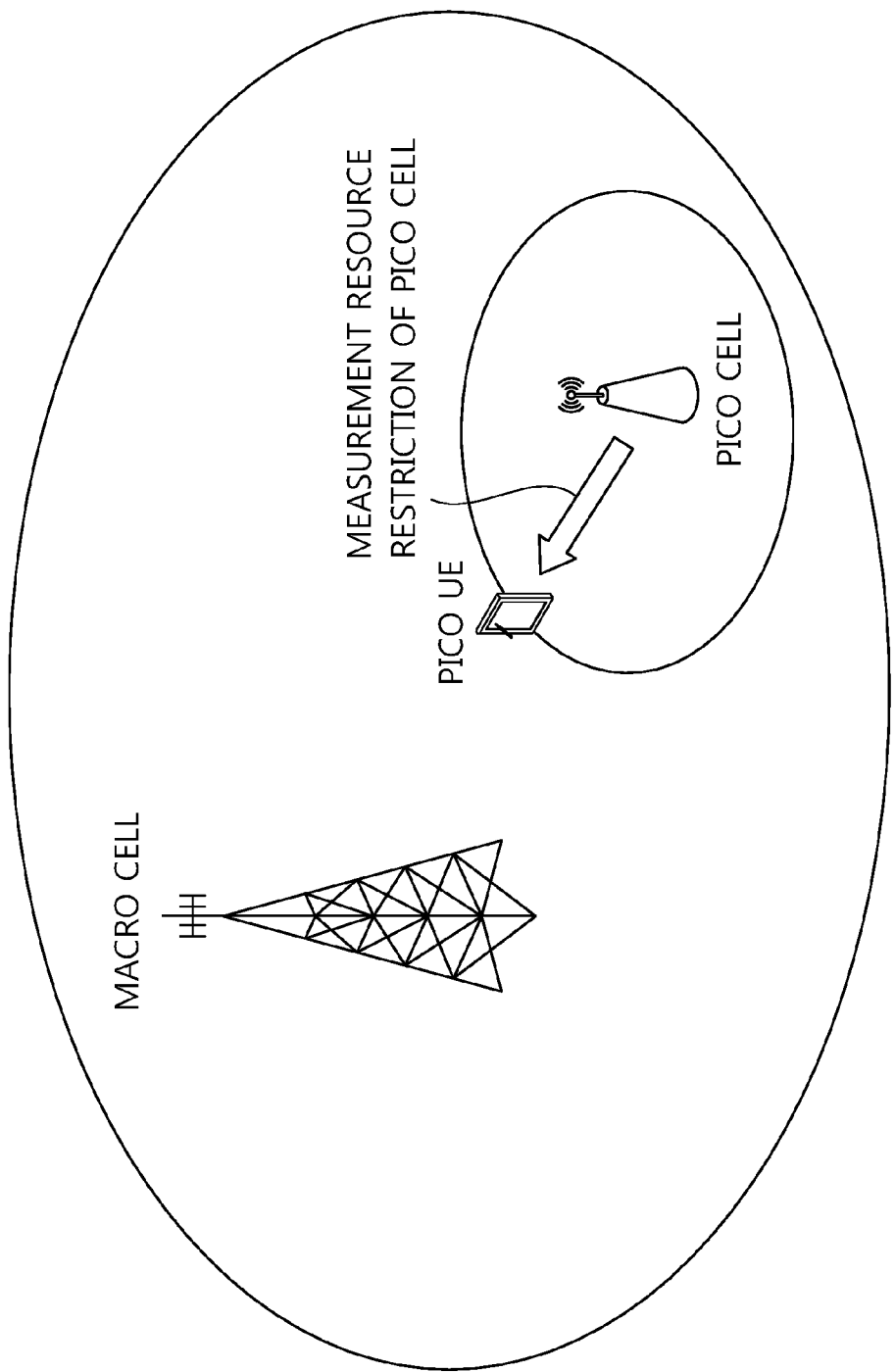
FIG. 21 illustrates a pico scenario.

FIG. 21 illustrates a pico scenario.

A pico cell is the serving cell of pico UE. A pico cell is a cell whose coverage is partially or fully overlapped with that of a macro cell. In general, a pica cell may have smaller coverage than a macro cell, but is not necessarily limited thereto.

Major interference conditions are generated when pico UE is placed at the edge of a pico serving cell. From a standpoint of pico UE, an interfering cell becomes a macro cell, and a pica cell becomes an interfered cell. The time domain ICIC is used for pico UE to continue to receive service from a pico cell.

When detecting that pico UE belongs to strong interference from a macro cell, a pico cell may configure a measurement resource restriction to the corresponding UE.

Pico UE may use a measurement resource restriction configured to RRM, RLM, and CSI measurement. That is, the pico UE may use resources for RLM in an ABS and perform measurement for RLM and CSI measurement in an ABS. When a pico cell is subject to strong interference from a macro cell, more precise measurement is possible by performing RRM/RLM/CSI measurement in an ABS.

Furthermore, if UE using a macro cell as a serving cell performs neighboring cell measurement in an ABS, mobility from the macro cell to a pico cell may be facilitated.

UE performs RRM measurement, such as Reference Signal Received Power (RSRP) and Reference Signal Received Quality (RSRQ), quality measurement, such as a Channel Quality Indicator (CQI), and path-loss measurement on a serving cell or a neighbor cell. Furthermore, UE may perform measurement, that is, an object of Radio Link Monitoring (RLM) for monitoring a connection with a serving cell.

An interfering cell and an interfered cell are determined depending on the object to be measured by UE.

If UE is sought to measure a serving cell, an intra-frequency neighboring cell having strong signal intensity near the UE may function as interference with serving cell measurement. In this case, the UE may experience a high level of interference due to a neighboring cell in serving cell measurement.

Downlink transport channels through which data is transmitted to UE in a network in eludes a broadcast channel (BCH) through which system information is transmitted, a paging channel (PCH) through which a paging message is transmitted, and a downlink shared channel (SCH) through which user traffic or a control message is transmitted. Multimedia Broadcast/Multicast Service (MBMS) traffic or a control message are transmitted through a downlink multicast channel (MCY). Meanwhile, a downlink transport channel through which data is transmitted from UE to a network includes a random access channel (RACH) through which an initial control message is transmitted and an uplink shared channel (SCH) through which user traffic or a control message is transmitted.

A logical channel is placed over a transport channel and mapped to the transport channel. A logical channel is basically divided into a logical channel for control and a logical channel for traffic.

A physical channel includes several subframes on the time axis and several subcarriers on the frequency axis. Here, one subframe includes a plurality of symbols on the time axis. One subframe includes a plurality of resource blocks, and one resource block includes a plurality of symbols and a plurality of subcarriers. Furthermore, each subframe may use specific subcarriers of specific symbols (e.g., the first symbol) of the corresponding subframe for a Physical Downlink Control Channel (PDCCH), that is, an L1/L2 control channel. One subframe is 0.5 ms, and a Transmission Time Interval (TTI) that is a unit time in which data is transmitted corresponds to two subframes.

Multimedia Broadcast/Multicast Service (MBMS) is serve in which multimedia data is provided to UE within a cell. A transport channel MCH channel for MBMS may be mapped to an MCCH or MTCH that is a logical channel. The MCCH channel sends an RRC message related to MBMS, and the MTCH channel sends traffic for specific MBMS service.

A plurality of MCHs may be used within one cell depending on the capacities of an MTCH and an MCCH. The MCH is responsible for the transmission of two logical channels called an MTCH and an MCCH. The two logical channels are mapped to a Physical Multicast Channel (PMCH) that is a physical channel.

One MCCH channel is present in one MBMS Single Frequency Network (MBSFN) area in which the same MBMS information/traffic is transmitted. If a plurality of MBSFN areas is provided in one cell, UE may receive a plurality of MCCHs. In a specific MCCH channel, if an RRC message related to MBMS is changed, a PDCCH channel sends an indicator indicative of an MBMS Radio Network Temporary Identity (M_RNTI) and a specific MCCH channel.

UE supporting MBMS may receive an M-RNTI and an MCCH indicator through a PDCCH, check that an RRC message related to MBMS has been changed in a specific MCCH channel, and receive the specific MCCH channel. The RRC message of the MCCH channel may be changed every change period and repeatedly broadcasted every repetition period.

An existing radio network may calculate the number of pieces of UE which receive specific service through a counting procedure. The counting procedure includes that UE sends an uplink counting response message when a radio network sends a downlink counting request message to the UE.

Today, as the amount of user data is explosively increased, the number of service providers which introduce heterogeneous networks for traffic offloading and service differentiation is gradually increased. A network environment in which an introduced heterogeneous network and a wireless communication system coexist may be called a heterogeneous network. The use of heterogeneous networks, such as a pico cell, a femto cell, a CSG cell, and Wi-Fi, is advantageous in that a network may be managed with a low cost and high efficiency and the level of service may be improved, but the introduction of heterogeneous networks is problematic in that the complexity of a radio environment is further increased. Furthermore, operations related to the measurement and mobility of UE may be different from the existing network in an environment in which heterogeneous networks are mixed. Accordingly, if a heterogeneous network radio environment is not optimized, service quality may be deteriorated, and use efficiency of radio resources may also be deteriorated. That is, in heterogeneous networks that have not been optimized, it may be difficult to obtain gains according to the introduction of heterogeneous networks.

Accordingly, in order to optimally maintain service quality and maximize the performance of UE and efficiency of radio resources in an environment in which heterogeneous networks are mixed, there is a need for a mechanism in which UE logs heterogeneous network information when detecting a heterogeneous network environment and reports the detected information to a network. As a method applicable to such a need, a mechanism, such as a logged MDT and a radio link failure report, can be proposed.

A logged MDT involves a procedure in which UE having mobility periodically performs measurement and performs logging on a measurement report when the UE is in an RRC idle state and reports the logged measurement to a network when the UE enters an RRC_connected state. As described above, the basic mechanism of the logged MDT may be applied to a measurement/report method for a heterogeneous network. When UE detects a radio signal from a heterogeneous network while moving, the UE may log information about the heterogeneous network and report a logged measurement result when entering an RRC_connected state in relation to a wireless communication system. It may be assumed that UE can support heterogeneous network communication as well as a wireless communication system in order to perform such operations. A logging and report method for a heterogeneous network is described in detail below with reference to the following drawings.

Figure 22:
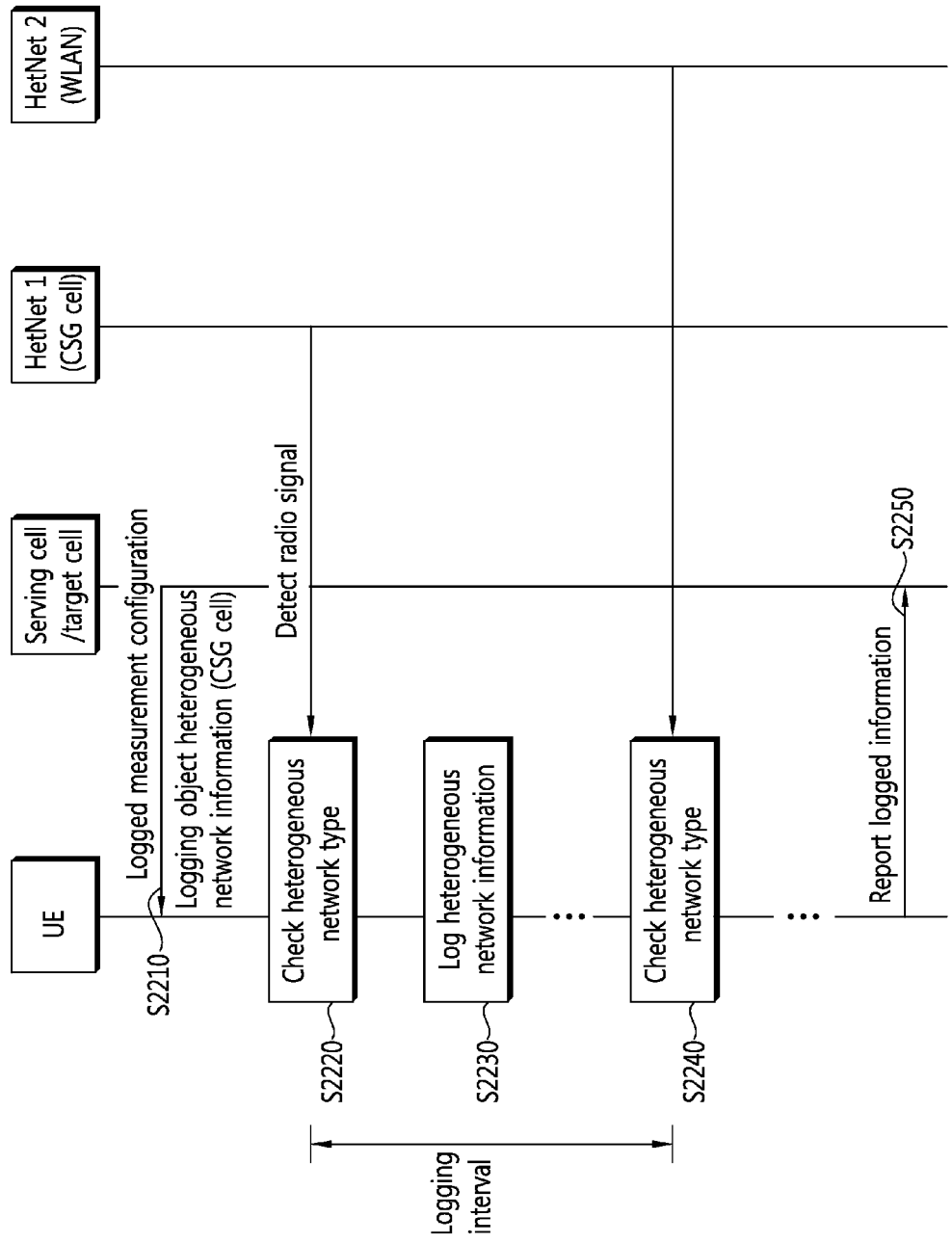
FIG. 22 is a flowchart illustrating a method of logging and reporting information about a heterogeneous network in accordance with an embodiment of the present invention.

FIG. 22 is a flowchart illustrating a method of logging and reporting information about a heterogeneous network in accordance with an embodiment of the present invention. The method of logging and reporting information about a heterogeneous network according to FIG. 22 may be based on a procedure for performing a logged MDT. Hereinafter, FIG. 22 illustrates a procedure for logging information about a heterogeneous network and reporting the information, but the information about a heterogeneous network may be transmitted along with logged measurement transmitted when a logged MDT is performed. That is, the logging and report of heterogeneous network information may be performed along with the logged MDT.

Referring to FIG. 22, UE receives a logged measurement configuration from a network (S2210). The logged measurement configuration includes information for performing a logged MDT described above with reference to FIG. 14. The logged measurement configuration may further include logging object heterogeneous network information for logging/reporting heterogeneous network information.

The logging object heterogeneous network information may include a heterogeneous network information logging indicator that triggers the UE to log information about a heterogeneous network. The UE may check the heterogeneous network information logging indicator and determine whether or not to log the heterogeneous network information.

The logging object heterogeneous network information may include a logging object heterogeneous network list indicative of a heterogeneous network to be logged. The UE may check the logging object heterogeneous network list and determine whether or not a heterogeneous network whose radio signal has been detected is a logging object. Only if the heterogeneous network is the logging object, the UE may log information about the corresponding heterogeneous network.

In the heterogeneous network list, a cell introduced for the purpose of offloading and local service coverage extension, such as a pico cell and a femto cell having a relatively smaller size than a common cell, may be indicated as the logging object heterogeneous network.

The heterogeneous network list may indicate a cell, such as a CSG cell that permits access by only pieces of specific UE.

The heterogeneous network list may indicate a cell that provides higher quality of service to only pieces of specific UE, such as a hybrid cell, than to different UE.

The heterogeneous network list may indicate cells which provide specific service, such as MBMS service.

The heterogeneous network list may indicate a radio eNB which provides a radio signal based on WLAN technology or a radio eNB.

The heterogeneous network information may indicate the above-described at least one heterogeneous network.

The UE may perform radio signal detection and logging when it receives the logged measurement configuration. In accordance with the logged MDT, the UE may log heterogeneous network information after entering an RRC idle state as if it performs periodic logging when the UE enters the RRC idle state.

The UE attempts to detect a radio signal and check the type of heterogeneous network for the detected radio signal (S2220). The UE may always attempt to detect a radio signal. The UE may periodically attempt to detect a radio signal at a logging interval or at an interval indicated by other information.

The type of heterogeneous network may correspond to a pico cell and a femto cell classified based on access rights, a CSG cell, a hybrid cell classified based on service quality, an MBMS service cell classified depending on whether or not it provides specific service, and a system, such a WLAN which provides another communication service.

The UE detects the radio signal of an LTE cell through measurement using an LTE communication module. The detected radio signal may include information about the measurement of the LTE cell and/or system information about the detected LTE cell. The UE may check the type of cell based on the information or the system information.

The system information about a cell may include information indicative of information about the size of the cell. The UE may check whether or not the corresponding cell is a femto cell or a pico cell based on the information.

The system information about a cell may include information about a cell identity list which may be used by only specific types of cells. The cell list information may be received by the UE through a detected cell. The UE may previously receive the cell list information from another cell that is not a detected cell and determine whether or not the detected cell is a specific type of a cell based on the cell list information. Accordingly, the UE may check whether or not a corresponding cell is a CSG cell and/or a hybrid cell.

The system information about a cell may include information indicative of the type of service provided by a cell. Accordingly, the UE may check whether or not the corresponding cell is a hybrid cell or a cell which provides MBMS service.

A cell that has transmitted a detected radio signal may be included in a plurality of cell types. For example, if a CSG cell provides MBMS service, UE may check that a corresponding cell is the CSG cell and also provides MBMS service based on system information.

UE may detect a WLAN signal through a WLAN module separately detected from an LTE communication module.

UE may detect a radio signal corresponding to each communication module and check the type of heterogeneous network using one or more communication modules at the same time.

FIG. 22 illustrates that a heterogeneous network 1 is a CSG cell. The UE may be aware that the heterogeneous network type of heterogeneous network 1 is a CSG cell based on the radio signal detected from the heterogeneous network 1.

The UE logs heterogeneous network information about the logging object heterogeneous network (S2230).

The UE may determine whether or not the corresponding heterogeneous network is a logging object heterogeneous network based on the logging object heterogeneous network information obtained from a network as a result of the check of the heterogeneous network type. If the type of heterogeneous network is included in a heterogeneous network list of the logging object heterogeneous network information, the UE may determine that the heterogeneous network is the logging object heterogeneous network. If the type of heterogeneous network is not included in a heterogeneous network list of the logging object heterogeneous network information, the UE may determine that the heterogeneous network is not the logging object heterogeneous network.

The heterogeneous network information logged by the UE may include information obtained by measuring the cell or the radio signal detected by the UE.

The heterogeneous network information logged by the UE may be information obtained by receiving a channel through which major control/configuration (e.g., system information transmitted through a BCCH) of the cell or a radio signal detected by the UE is transmitted.

The heterogeneous network information logged by the UE may be different depending on the type of logging object heterogeneous network If the type of heterogeneous network is a pico cell or a femto cell, the following information may be logged.
 The identity of a cell
 A measurement value for a cell
 Information indicative of the size of a cell
 Information indicative of the type of cell
 Specific cell identity list information permitted to use by only specific cell types of cells detected by UE
 A PLMN to which a cell belongs
 Whether or not the cell manages an ABS If the type of heterogeneous network is a CSG or hybrid cell, the following information related to a CSG cell may be logged.
 The identity of a cell
 A measurement value for a cell
 Information indicative of the type of cell
 CSG information about a cell (a CSG indicator, a CSG identity, whether or not UE is a member of a CSG, and an access mode of the cell (closed mode or hybrid mode))
 A PLMN to which a cell belongs
 Whether or not the cell manages an ABS If the type of heterogeneous network is a cell which provides MBMS service, MBMS related information about a cell may be logged. The MBMS related information is information received from an MBMS cell and may be as follows.
 MBMS session identity information
 MBMS service identity information
 Information about one or more frequencies provided by MBMS service
 Information about a frequency selected by UE in order to receive MBMS service
 MBSFN subframe configuration information (subframes reserved for an MBSFN in downlink)
 Information necessary to receive MBMS control information associated with an MBSFN region If the type of heterogeneous network is a WLAN, WLAN information may be logged. The WLAN information may be information obtained by UE through the measurement of a radio signal or information obtained by UE through the decoding of a radio signal. The WLAN information may be as follows.
 The identity (e.g., a Service Set ID (SSID)) of BS/service that provides a WLAN signal
 A beacon period of a WLAN
 The signal intensity (e.g., RSSI) of a WLAN signal and the quality (SNR) of a WLAN signal
 A security mode and a security algorithm used in a WLAN
 Frequency information (e.g., channel information) about a WLAN signal
 The type (e.g., IEEE 802.11a, 802.11b, 802.11g, and 802.11n) of WLAN technology In logging heterogeneous network information, UE may also log the following common logging information.
 Information about the current location of UE
 Logging time information
 The identity of a serving cell
 A measurement level of a serving cell In the example of FIG. 22, the UE may check that the heterogeneous network 1 is a logging object and log information about the heterogeneous network 1. The logged heterogeneous network information may include the above-described information about a CSG cell and common logging information.

As described above, the UE may check the type of heterogeneous network by detecting a radio signal and thus may periodically log heterogeneous network information. An interval in which the type of heterogeneous network is checked and the heterogeneous network information is logged may be set to a value indicated by a logging interval included in a logged measurement configuration. The UE may periodically detect a radio signal at an interval before logging duration elapses, check the type of heterogeneous network, and log heterogeneous network information, if necessary, after the check.

Referring back to FIG. 22, the UE detects a radio signal from a heterogeneous network 2 and checks the type of heterogeneous network (S2240). The UE may check that the type of heterogeneous network 2 is a WLAN type based on the detected radio signal and the type of heterogeneous network. In this case, the UE may check that the heterogeneous network 2 is not a logging object and may not log information about the heterogeneous network 2.

Meanwhile, unlike in FIG. 22, logging may be performed only when specific conditions are satisfied. The specific conditions may be as follows.

When a measurement value of a cell of a detected heterogeneous network or a measurement value of a detected heterogeneous network signal is equal to or higher than a threshold When a measurement value of a cell of a detected heterogeneous network or a measurement value of a detected heterogeneous network signal is equal to or less than a threshold When a measurement value of the serving cell of UE is less than a threshold The UE reports the logged heterogeneous network information to a network (S2250). The UE may start reporting the logged heterogeneous network information to the network by including information, indicating that the logged heterogeneous network information is present, in an RRC connection confirmation message after entering an RRC_connected state in relation to a specific cell. In response thereto, the cell requests the UE to report the logged heterogeneous network information. In response to the request, the UE may report the logged heterogeneous network information.

Unlike in the example of FIG. 22, a method in which UE logs heterogeneous network information in real time and immediately reports the heterogeneous network information to a network may be proposed. This may be performed like the execution of an immediate MDT and may be performed along with the immediate MDT. In this case, a measurement configuration including information necessary to perform the measurement of the UE may further include information instructing that heterogeneous network information be generated and reported when a radio signal from a heterogeneous network is detected. The measurement configuration may include information indicative of a target heterogeneous network from which UE detects a signal and for which the UE generates information. This may be implemented like logging object heterogeneous network information according to the embodiment of FIG. 22.

In this case, the UE detects a heterogeneous network signal in the RRC_connected state and checks the type of heterogeneous network. If the type of heterogeneous network corresponds to a target heterogeneous network, the UE may log heterogeneous network information and immediately report the logged heterogeneous network information to a network. The heterogeneous network information may be configured in the same manner as information implemented in the embodiment described above with reference to FIG. 22.

Unlike in the example of FIG. 22, the UE may further report radio link failure information and heterogeneous network information, generated when a radio link failure occurs or when a handover failure occurs, to a network. In this case, when a radio signal from a heterogeneous network is detected, the UE may log information about the heterogeneous network and report the radio link failure information and the logged heterogeneous network information to the network if conditions that the radio link failure information may be reported to the network are satisfied.

The UE may report the logged heterogeneous network information to a network only when a serving cell corresponds to a specific PLMN. To this end, the UE may be provided with a target PLMN list whose logged heterogeneous network information may be validly reported from the network in advance. In reporting the logged heterogeneous network information, the UE may report the logged heterogeneous network information only when a current cell is a cell corresponding to a PLMN included in the PLMN list. In addition, when a current cell is an Registered PLMN (RPLMN) of the UE, the UE may report the logged heterogeneous network information. The above-described PLMN list may be included in a logged measurement configuration and transferred to the UE.

Figure 23:
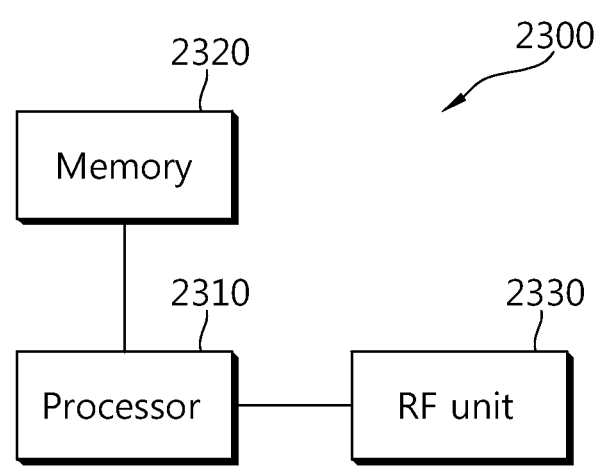
FIG. 23 is a block diagram showing a radio device in which an embodiment of the present invention can be implemented.

FIG. 23 is a block diagram showing a radio device in which an embodiment of the present invention can be implemented. The apparatus can implement the operation of UE according to the embodiment of FIG. 22.

The radio device 2300 includes a processor 2310, memory 2320, and a Radio Frequency (RF) unit 2330. The processor 2310 implements the proposed functions, processes and/or methods. The processor 2310 can include at least one communication module and can detect a series of wireless communication signals including LTE and also detect a heterogeneous wireless communication signal, such as a WLAN. The processor 2310 can receive information about a logging object heterogeneous network and determine whether or not the logging object heterogeneous network is a logging object depending on the type of heterogeneous network whose radio signal has been detected. The processor 2310 can log heterogeneous network information about the logging object heterogeneous network. The processor 2310 can report the logged information to a network. The embodiment of FIG. 22 can be implemented by the processor 2310 and the memory 2320.

The RF unit 2330 is connected to the processor 2310, and it transmits and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing radio signals. When the above-described embodiment is implemented in software, the above-described scheme may be implemented into a module (process or function) configured to perform the above function. The module may be stored in the memory and executed by the processor. The memory may be placed inside or outside the processor and connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The invention claimed is:

1. A method for reporting, performed by user equipment (UE), in a wireless communication system, the method comprising:
   receiving a logged measurement configuration comprising logging object heterogeneous network information;
   attempting to detect a radio signal transmitted by a heterogeneous network;
   checking a heterogeneous network type of the heterogeneous network when the radio signal is detected;
   determining whether or not the heterogeneous network is a logging object based on the logging object heterogeneous network information and the checked heterogeneous network type;
   logging information about the heterogeneous network and common logging information if the heterogeneous network is the logging object; and
   reporting the logged information,
   wherein the logging object heterogeneous network information includes a logging object heterogeneous network list indicative of a type of at least one heterogeneous network that is the logging object,
   wherein the determining of whether or not the heterogeneous network is the logging object comprises determining that the heterogeneous network is the logging object if the checked heterogeneous network type is included in the logging object heterogeneous network list, and
   wherein the logged measurement configuration further comprises logging interval information indicative of an interval in which the detection of the radio signal is attempted.

2. The method of claim 1, wherein the step of attempting to detect the radio signal is periodically performed based on the interval.

3. The method of claim 2, wherein the common logging information comprises at least one of information about a location of the UE when the logging is performed, information about a time when the logging is performed, information about an identity of a serving cell when the logging is performed, and a measurement level of the serving cell.

4. The method of claim 3, wherein the step of reporting the logged information comprises:
   sending, by the UE, a logged information-available indicator to a target cell with which a Radio Resource Control (RRC) connection has been established, the logged information-available indicator indicating that the logged information to be reported is present;
   receiving a report request from the target cell as a response to the logged information-available indicator; and
   sending all or part of the logged information to the target cell in response to the report request.

5. The method of claim 1, wherein the type of the at least one heterogeneous network that is the logging object indicated by the logging object heterogeneous network information comprises one or more of a Closed Subscriber Group (CSG) cell, a hybrid cell, a cell supporting Multimedia Broadcast and Multicast Service (MBMS), a femto cell, a pico cell, and a Wireless Local Area Network (WLAN).

6. The method of claim 5, wherein if the heterogeneous network is the CSG cell or the hybrid cell, the step of determining the type of heterogeneous network comprises determining the type of heterogeneous network based on a cell identity included in system information transmitted by the heterogeneous network.

7. The method of claim 6, wherein if the heterogeneous network is the logging object, the information about the heterogeneous network comprises at least one of a cell identity of the heterogeneous network, a heterogeneous network type indicator indicative of the type of heterogeneous network, a CSG indicator of the heterogeneous network, a CSG identity of the heterogeneous network, an indicator indicative of whether or not the UE is a member of the heterogeneous network, an access mode of the heterogeneous network, an indicator indicative of a Public Land Mobile Network (PLMN) corresponding to the heterogeneous network, and an indicator indicative of whether or not the heterogeneous network manages an Almost Blank Subframe (ABS).

8. The method of claim 5, wherein if the heterogeneous network is the femto cell or the pico cell, the step of determining the type of heterogeneous network comprises determining the type of heterogeneous network based on information about a cell size which is included system information transmitted by the heterogeneous network.

9. The method of claim 8, wherein if the heterogeneous network is the logging object, the information about the heterogeneous network comprises at least one of a cell identity of the heterogeneous network, a measurement value for the heterogeneous network, information indicative of a size of the heterogeneous network, information indicative of a cell type of the heterogeneous network, a specific cell identity list permitted to be used by only specific cell types of cells, such as the heterogeneous network, an indicator indicative of a Public Land Mobile Network (PLMN) corresponding to the heterogeneous network, and an indicator indicative of whether or not the heterogeneous network manages an Almost Blank Subframe (ABS).

10. The method of claim 5, wherein if the heterogeneous network is the cell supporting MBMS, the step of determining the type of heterogeneous network comprises determining the type of heterogeneous network based on an indicator of service which is supported by the heterogeneous network and included in system information transmitted by the heterogeneous network.

11. The method of claim 10, wherein if the heterogeneous network is the logging object, the information about the heterogeneous network comprises at least one of MBMS session identity information, MBMS service identity information, information about at least one frequency provided by MBMS service, information about a frequency selected by the UE in order to receive MBMS service, MBMS Single Frequency Network (MBSFN) subframe configuration information, and information necessary to receive MBMS control information related to an MBSFN area.

12. The method of claim 5, wherein if the heterogeneous network is a WLAN and the heterogeneous network is the logging object, the information about the heterogeneous network comprises at least one of a Service Set ID (SSID) of the heterogeneous network, a beacon frame transmission period of the heterogeneous network, Received Signal Strength Indicator (RSSI) of the heterogeneous network, a Signal to Noise Ratio (SNR) of the heterogeneous network, a security mode and a security algorithm operating in the heterogeneous network, information about a channel of the heterogeneous network, and WLAN technology type indication information about the heterogeneous network.

13. A wireless apparatus comprising:
a transceiver transmitting and receiving radio signals; and
a processor operably coupled to the transceiver, wherein the processor is configured to:
receive a logged measurement configuration comprising logging object heterogeneous network information;
attempt to detect a radio signal transmitted by a heterogeneous network;
check a heterogeneous network type of the heterogeneous network when the radio signal is detected;
determine whether or not the heterogeneous network is a logging object based on the logging object heterogeneous network information and the checked heterogeneous network type;
log information about the heterogeneous network and common logging information if the heterogeneous network is the logging object; and
report the logged information,
wherein the logging object heterogeneous network information includes a logging object heterogeneous network list indicative of a type of at least one heterogeneous network that is the logging object,
wherein the determining of whether or not the heterogeneous network is the logging object comprises determining that the heterogeneous network is the logging object if the checked heterogeneous network type is included in the logging object heterogeneous network list, and
wherein the logged measurement configuration further comprises logging interval information indicative of an interval in which the detection of the radio signal is attempted.

14. The wireless apparatus of claim 13, wherein the attempting to detect the radio signal is periodically performed based on the interval.

15. The wireless apparatus of claim 14, wherein the common logging information comprises at least one of information about a location of the UE when the logging is performed, information about a time when the logging is performed, information about an identity of a serving cell when the logging is performed, and a measurement level of the serving cell.

16. The wireless apparatus of claim 15, wherein the reporting the logged information comprises:
sending, by the UE, a logged information-available indicator indicating that the logged information is present to a target cell with which a Radio Resource Control (RRC) connection has been established;
receiving a report request from the target cell as a response to the logged information-available indicator; and
sending part of the entire logged information to the target cell in response to the report request.

* * * * *